(12) United States Patent
Kaneda et al.

(10) Patent No.: US 10,574,977 B2
(45) Date of Patent: Feb. 25, 2020

(54) FLOATING IMAGE DISPLAY UNIT

(71) Applicant: SONY CORPORATION, Tokyo (JP)

(72) Inventors: Kazumasa Kaneda, Kanagawa (JP); Isamu Nakao, Tokyo (JP); Hiroyuki Ono, Tokyo (JP); Yohei Fukuma, Chiba (JP)

(73) Assignee: SONY CORPORATION, Tokyo (JP)

( * ) Notice: Subject to any disclaimer, the term of this patent is extended or adjusted under 35 U.S.C. 154(b) by 76 days.

(21) Appl. No.: 15/127,870

(22) PCT Filed: Mar. 6, 2015

(86) PCT No.: PCT/JP2015/056646
§ 371 (c)(1),
(2) Date: Sep. 21, 2016

(87) PCT Pub. No.: WO2015/151719
PCT Pub. Date: Oct. 8, 2015

(65) Prior Publication Data
US 2017/0099480 A1    Apr. 6, 2017

(30) Foreign Application Priority Data
Mar. 31, 2014    (JP) .................................. 2014-072476

(51) Int. Cl.
*G02B 5/30*      (2006.01)
*G02B 27/22*     (2018.01)
*H04N 13/39*     (2018.01)

(52) U.S. Cl.
CPC ........... *H04N 13/39* (2018.05); *G02B 5/3025* (2013.01); *G02B 5/3083* (2013.01); *G02B 27/2292* (2013.01)

(58) Field of Classification Search
CPC ........ G02B 5/045; G02B 5/124; G02B 5/122; G02B 5/136; G02B 5/3025; G02B 5/3083;
(Continued)

(56) References Cited

U.S. PATENT DOCUMENTS 6,195,136 B1*    2/2001   Handschy ............ G02B 27/1033
                                                          349/5
2010/0195055 A1*  8/2010   Maekawa ............... G02B 5/136
                                                          353/10

(Continued)

FOREIGN PATENT DOCUMENTS

JP    09-506717 A    6/1997
JP    2008-158114 A  7/2008
(Continued)

*Primary Examiner* — Marin Pichler
(74) *Attorney, Agent, or Firm* — Chip Law Group

(57) ABSTRACT

A floating image display unit according to an embodiment of the technology includes an optical plate and one or a plurality of reflectors. The optical plate includes a plurality of optical elements arranged in a matrix on a substrate having a normal in a Z-axis direction, and each of the optical elements is configured to regularly reflect an entering light beam of a Z-axis direction component and recursively reflect an entering light beam of an XY-axis direction component. The one or the plurality of reflectors are configured to reflect light outputted from a light emitter or a light irradiation target object disposed on rear surface side of the optical plate, thereby causing the light to obliquely enter a rear surface of the optical plate.

13 Claims, 19 Drawing Sheets

(58) Field of Classification Search
CPC ............ G02B 27/2292; G02B 27/2271; H04N 13/0488; H04N 13/049; H04N 13/0459; H04N 13/0443
USPC ........... 359/529–530, 627, 834, 836, 487.05; 353/7, 81, 99, 10, 28; 345/7, 32, 424; 385/51
See application file for complete search history.

(56) References Cited

U.S. PATENT DOCUMENTS

| | | | |
|---|---|---|---|
| 2012/0081788 A1* | 4/2012 | Maekawa | G02B 17/002 359/546 |
| 2015/0124222 A1* | 5/2015 | Juni | H04N 13/04 353/10 |

FOREIGN PATENT DOCUMENTS

| | | | |
|---|---|---|---|
| JP | 2010-224292 A | 10/2010 | |
| JP | 2010-262229 A | 11/2010 | |
| JP | 2012-048002 A | 3/2012 | |
| WO | 2009/017134 A1 | 2/2009 | |

* cited by examiner

[FIG. 1]
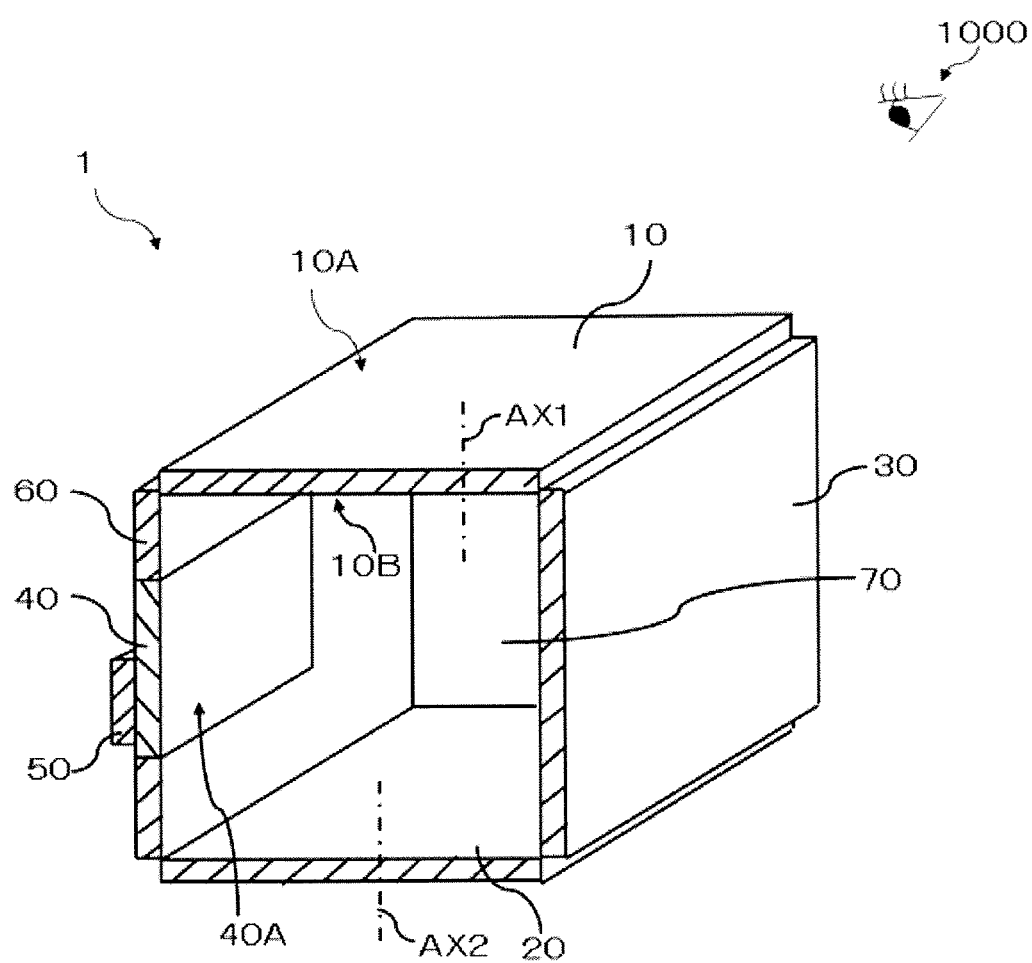

[ FIG. 2 ]
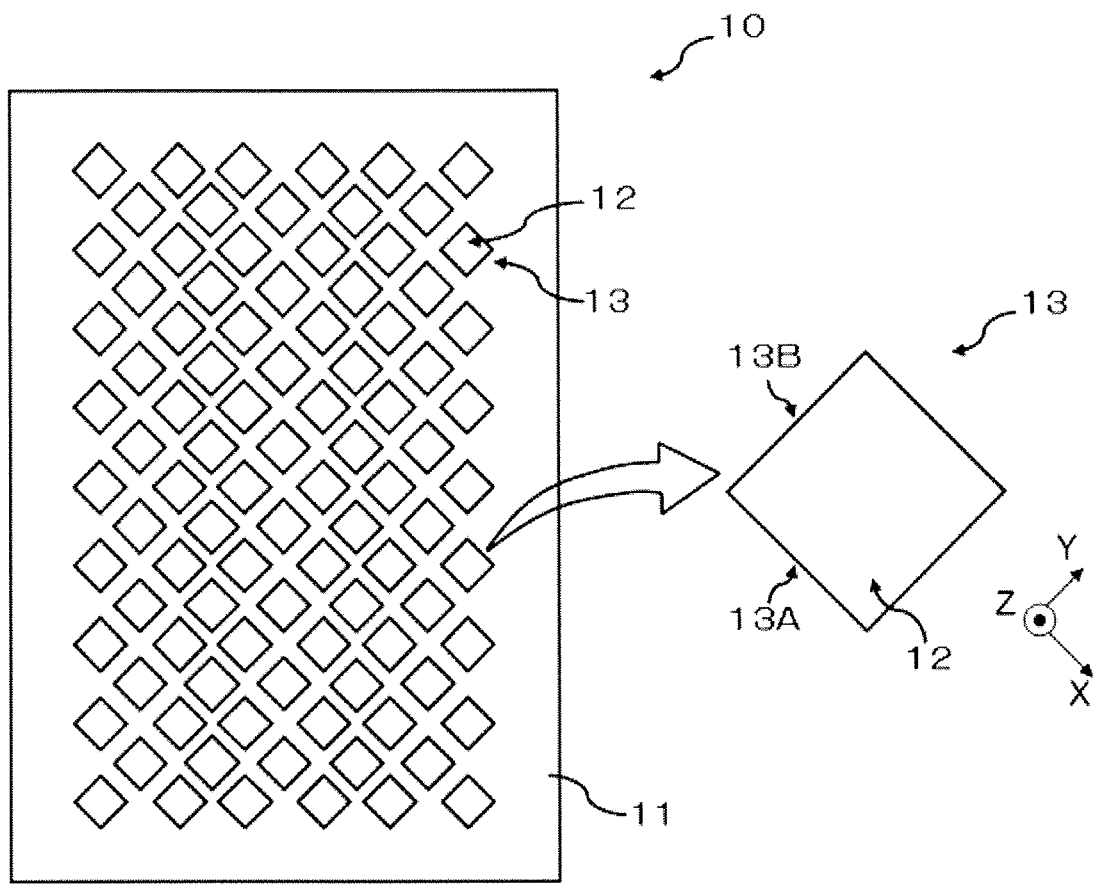

[ FIG. 3 ]
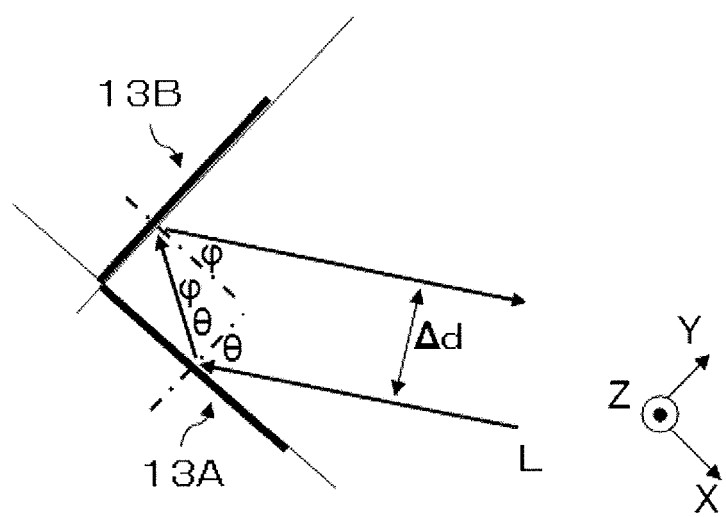
[ FIG. 4 ]
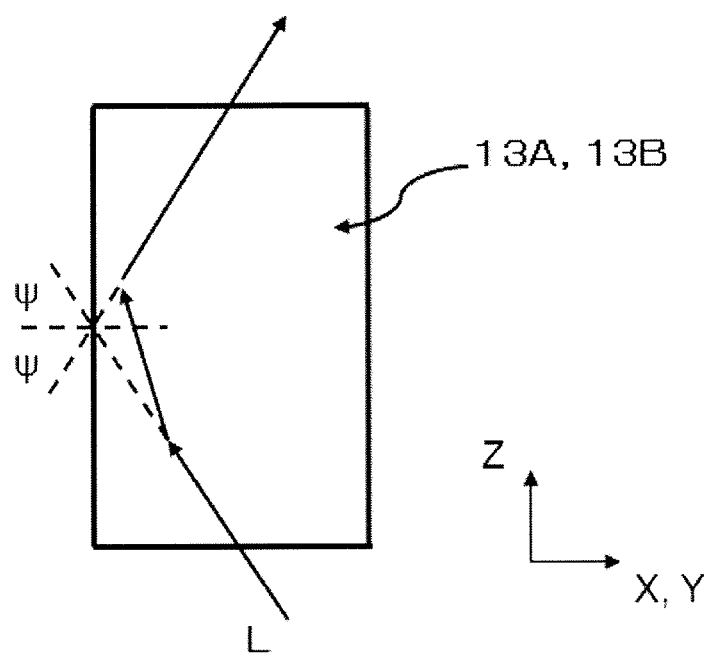

[ FIG. 5 ]
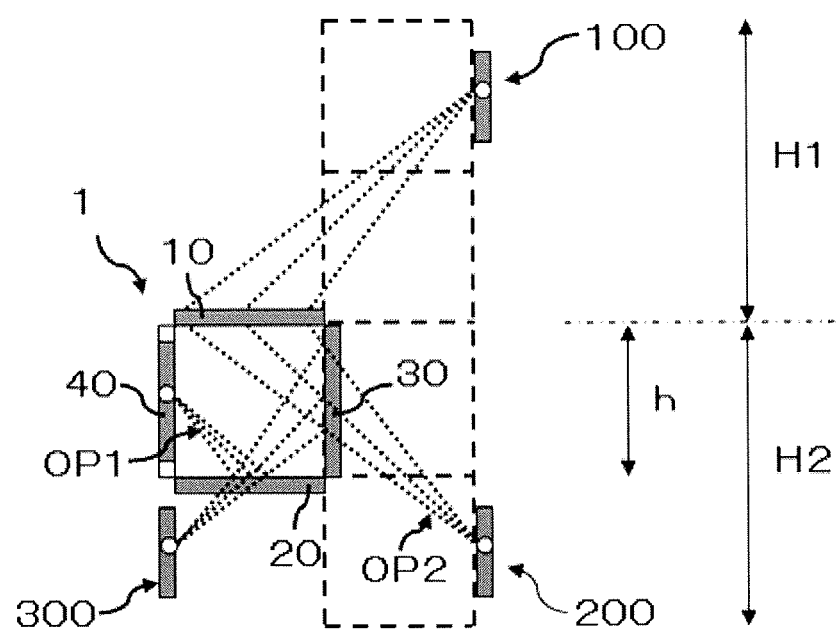

[ FIG. 6 ]
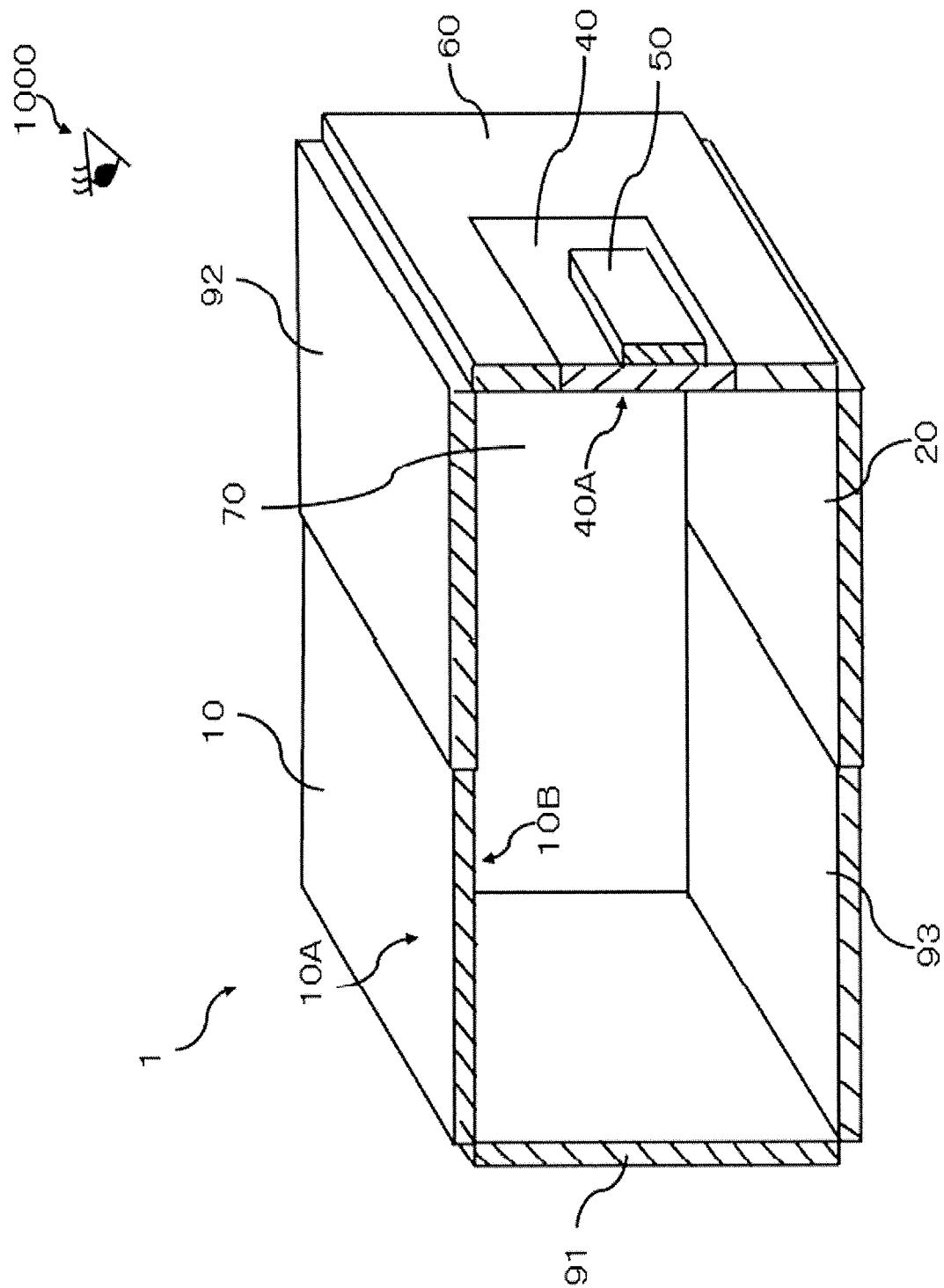

[ FIG. 7 ]
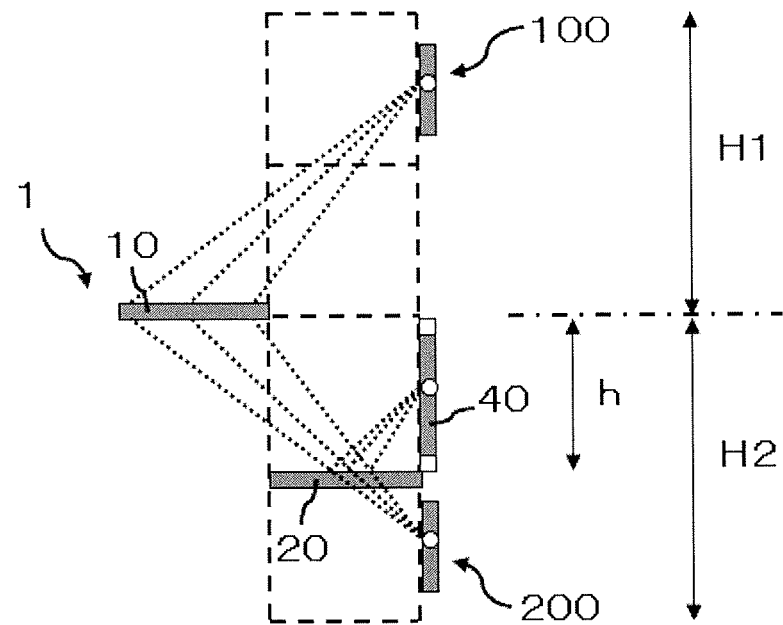
[ FIG. 8 ]
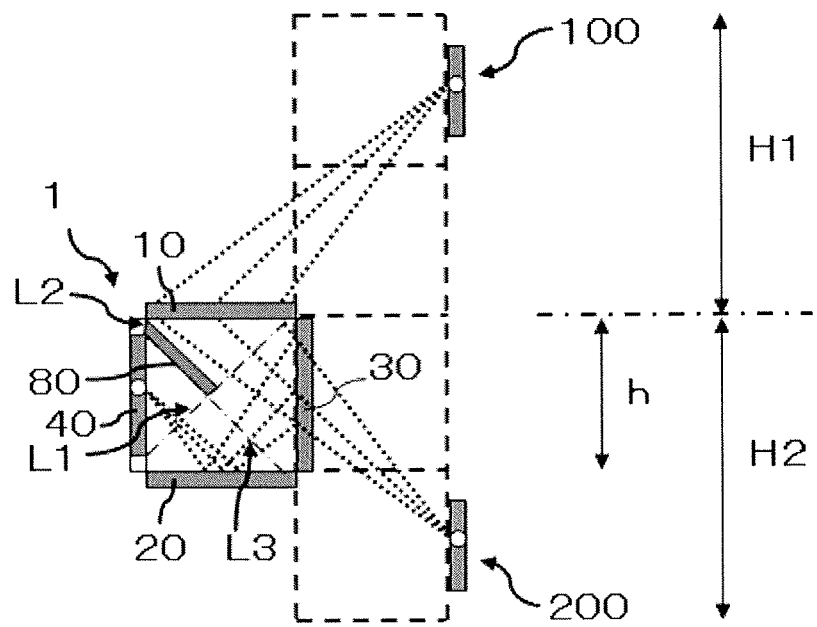

[ FIG. 9 ]
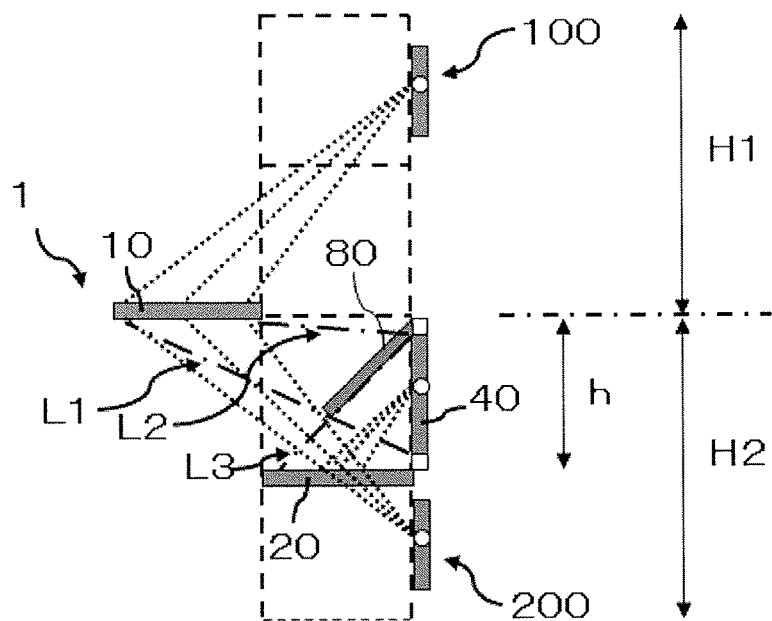
[ FIG. 10 ]
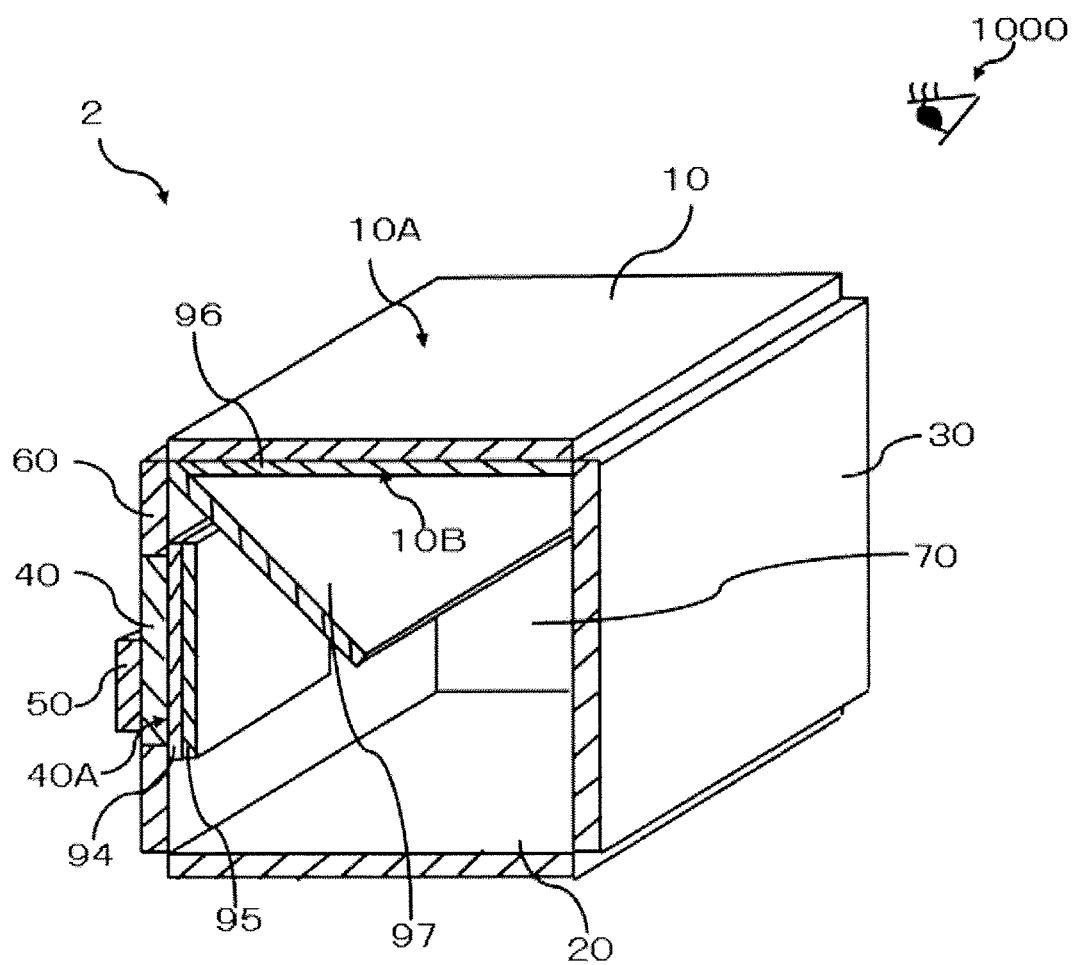

[ FIG. 11 ]
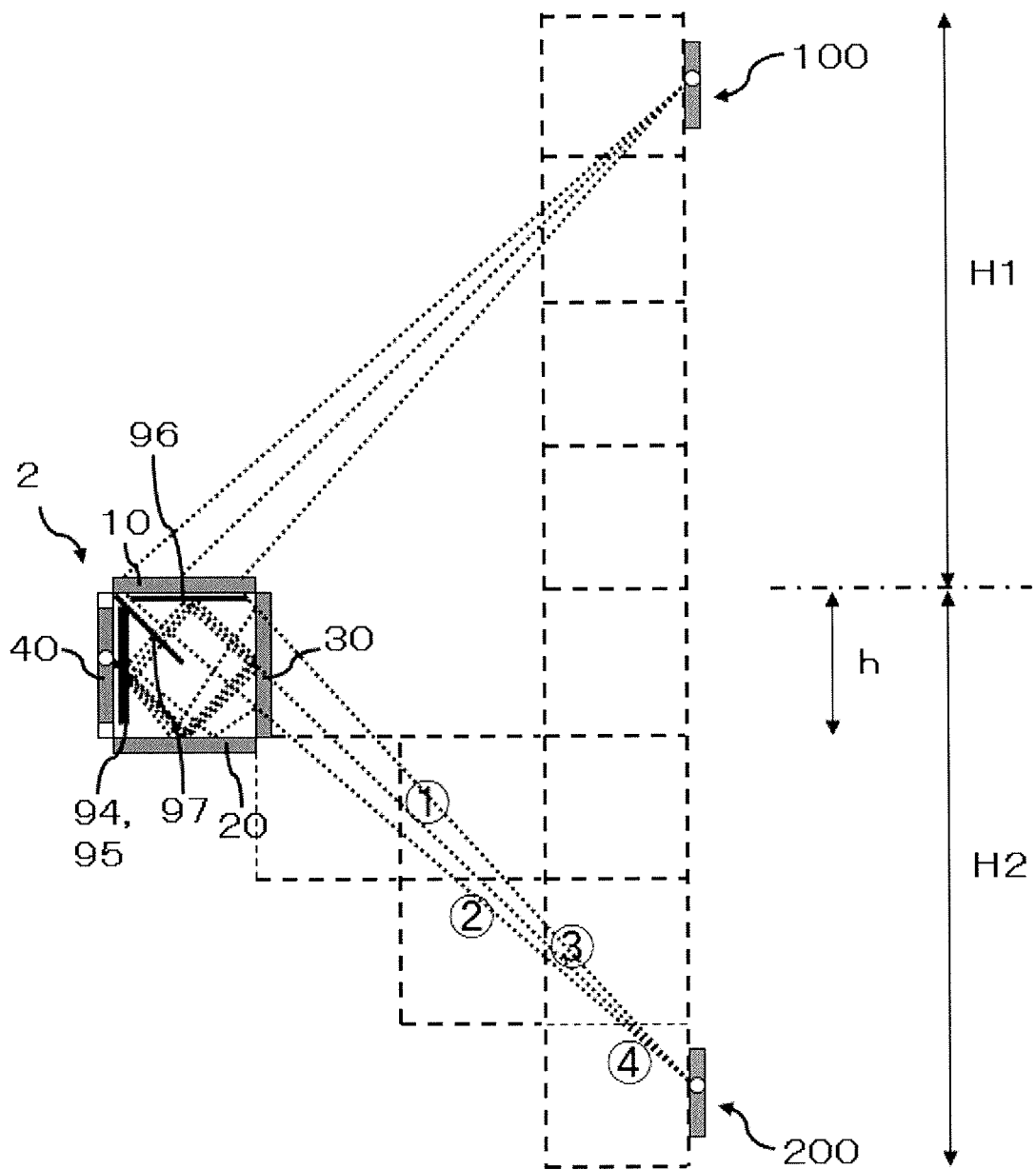

[ FIG. 12 ]
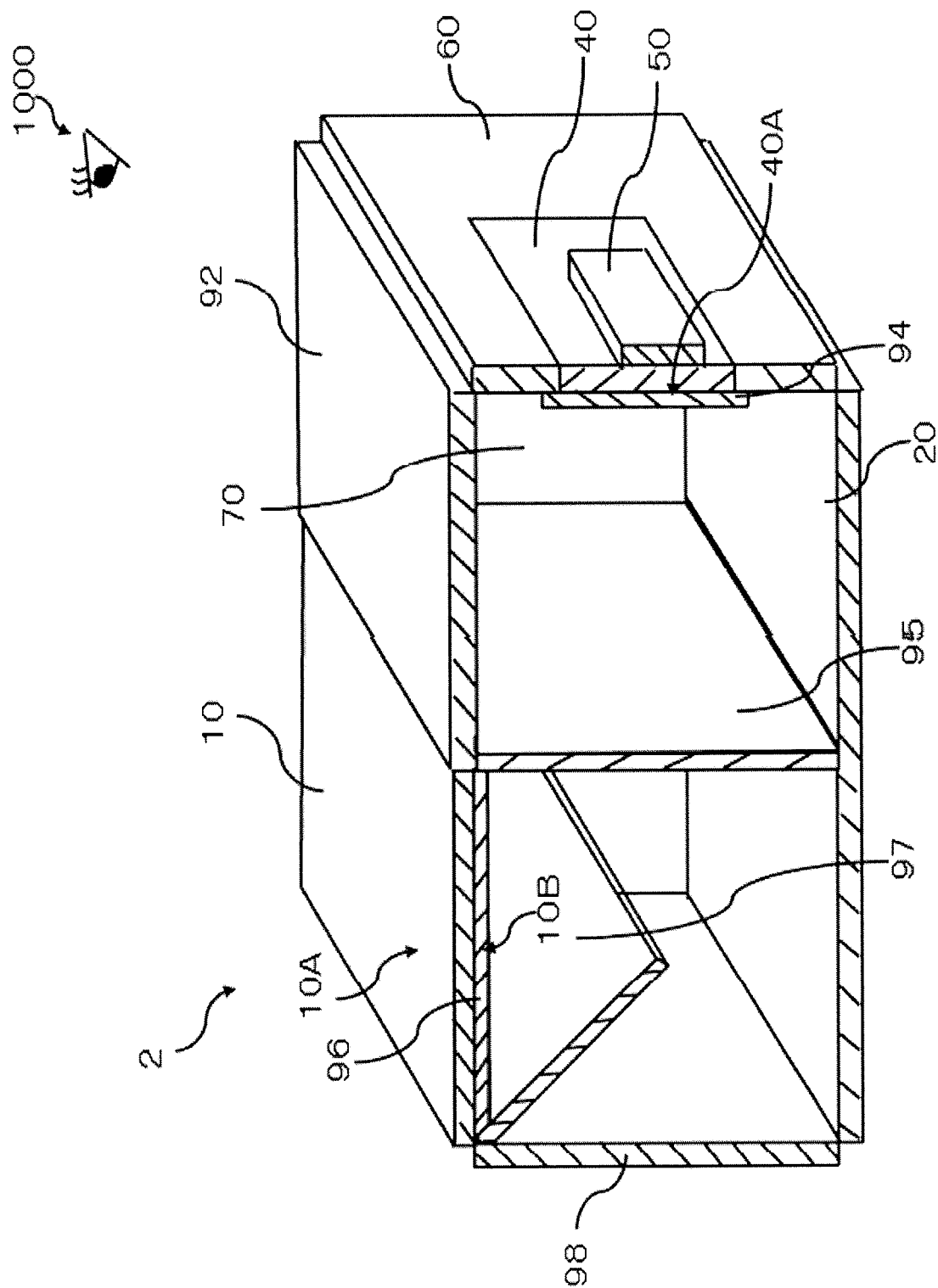

[ FIG. 13 ]
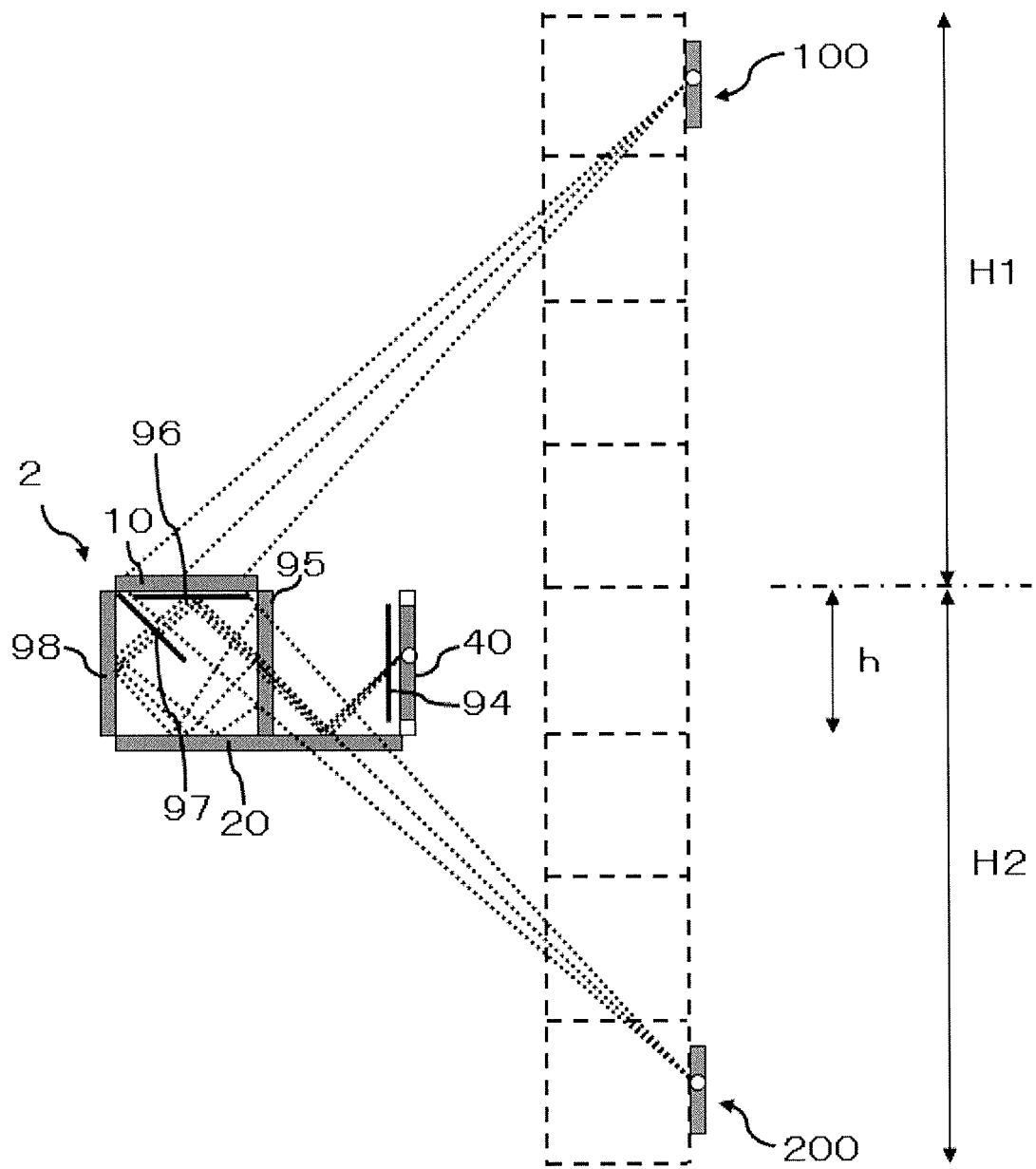

[FIG. 14]
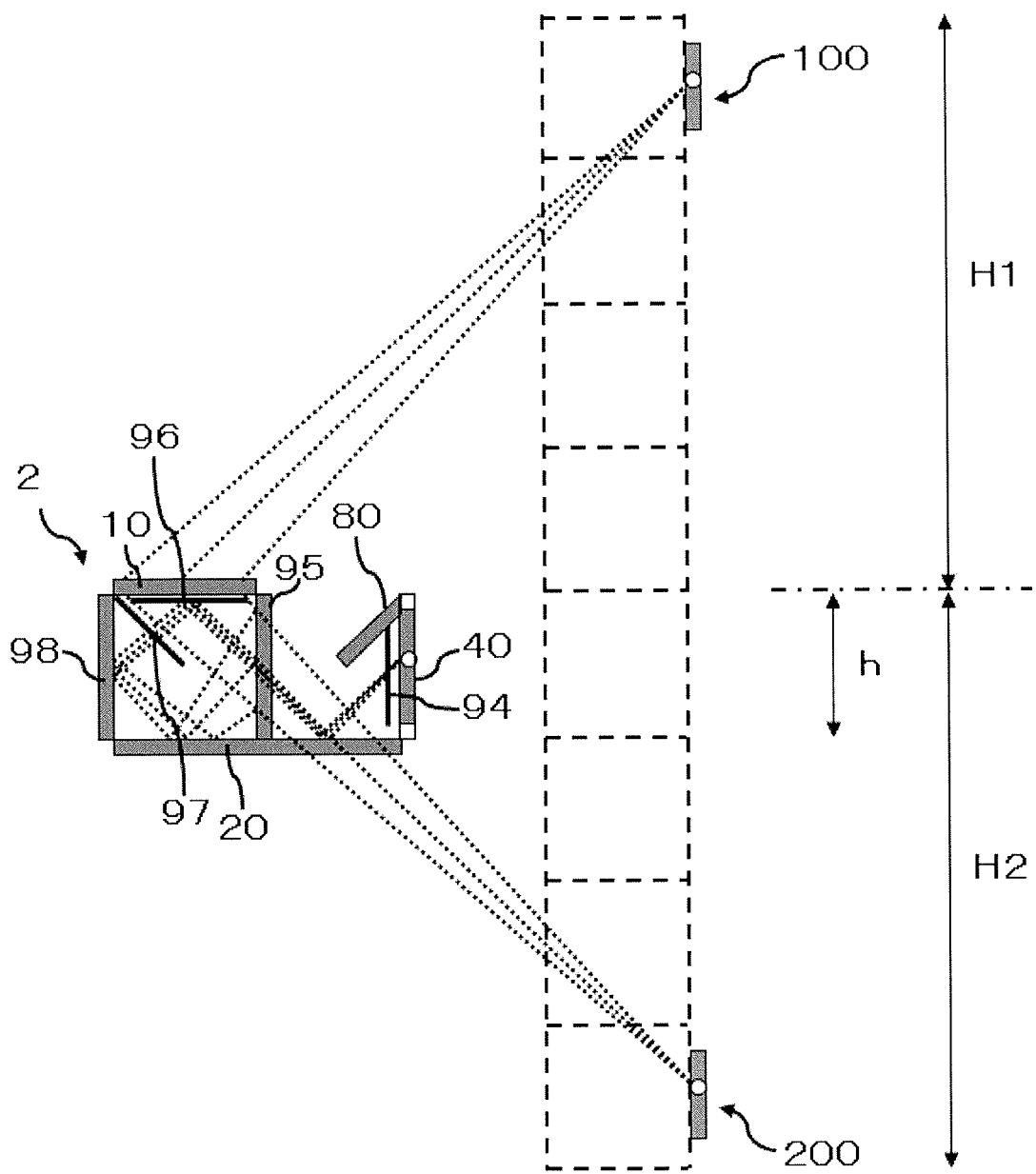

[ FIG. 15 ]
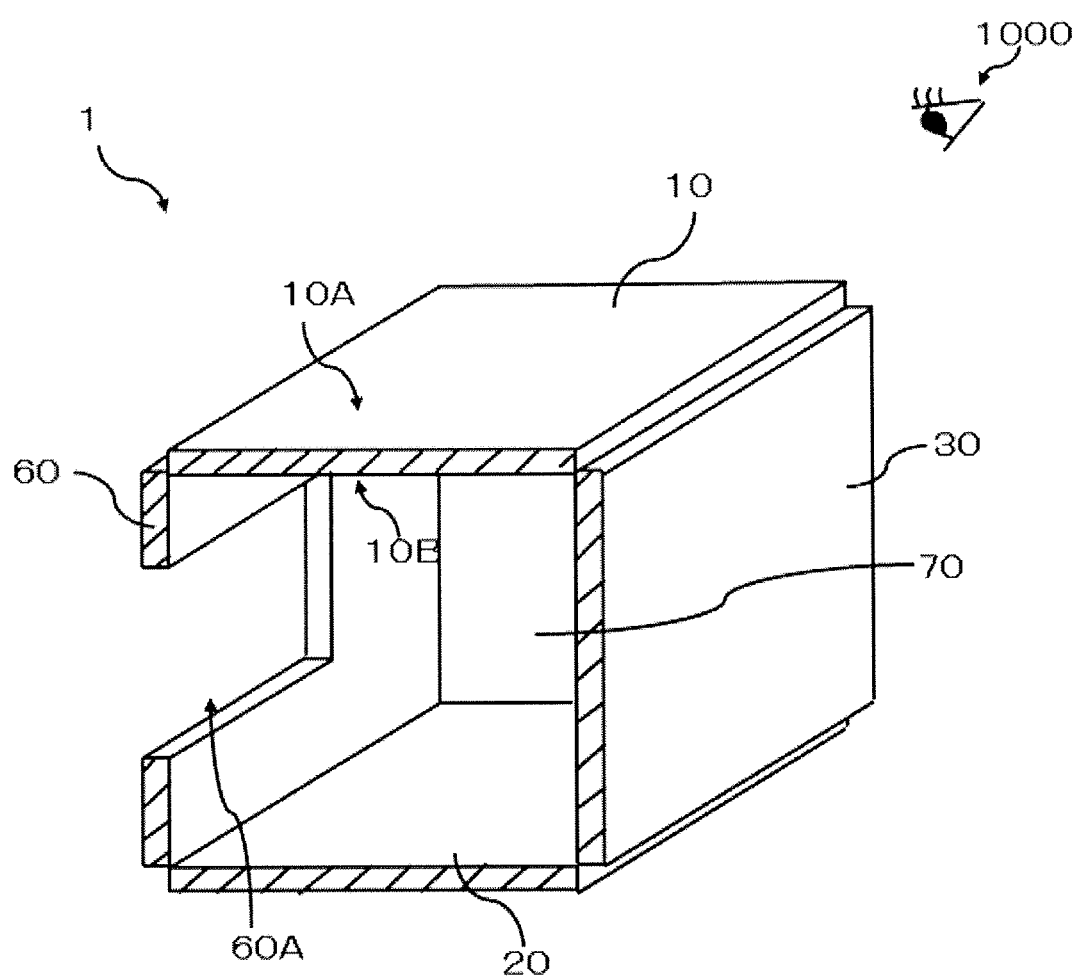

[ FIG. 16 ]
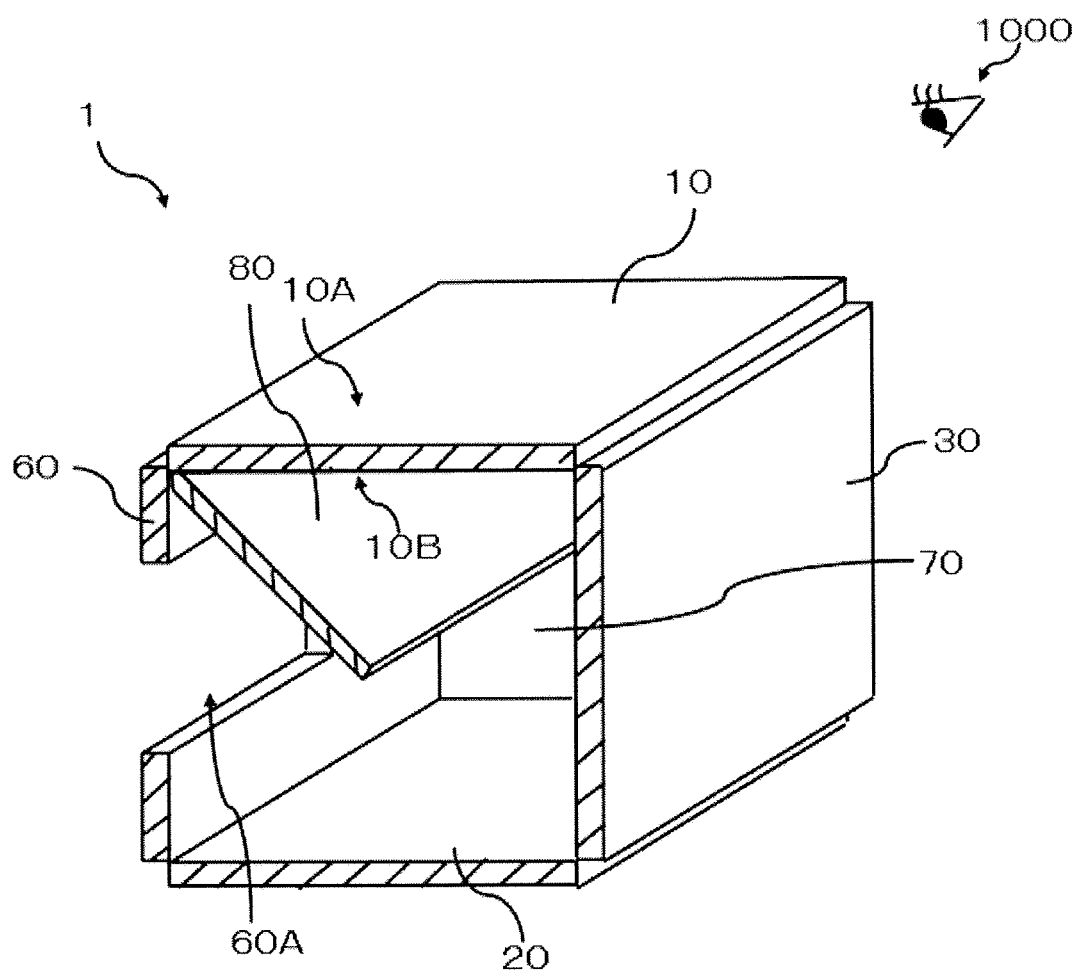

[ FIG. 17 ]
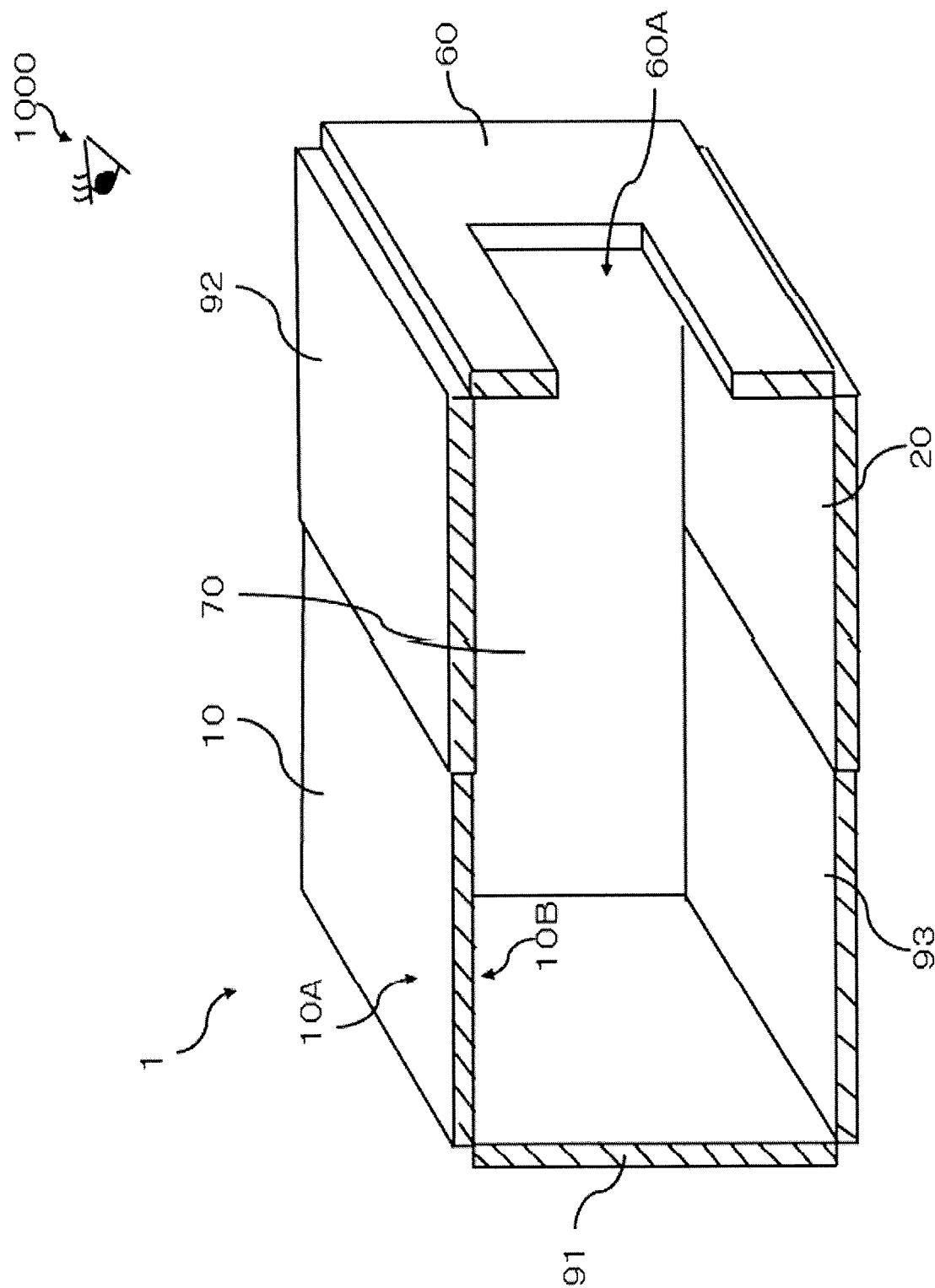

[ FIG. 18 ]
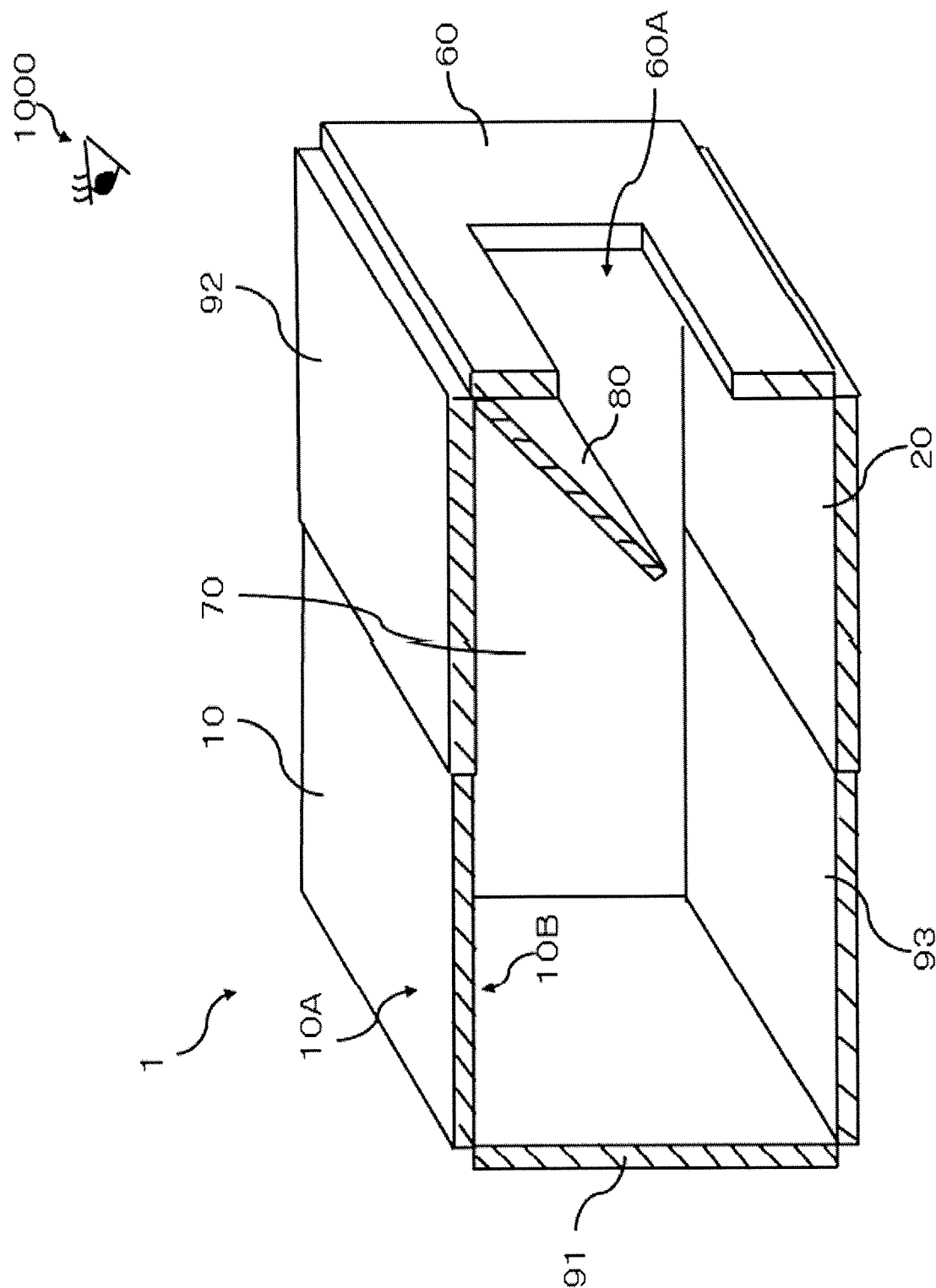

[FIG. 19]
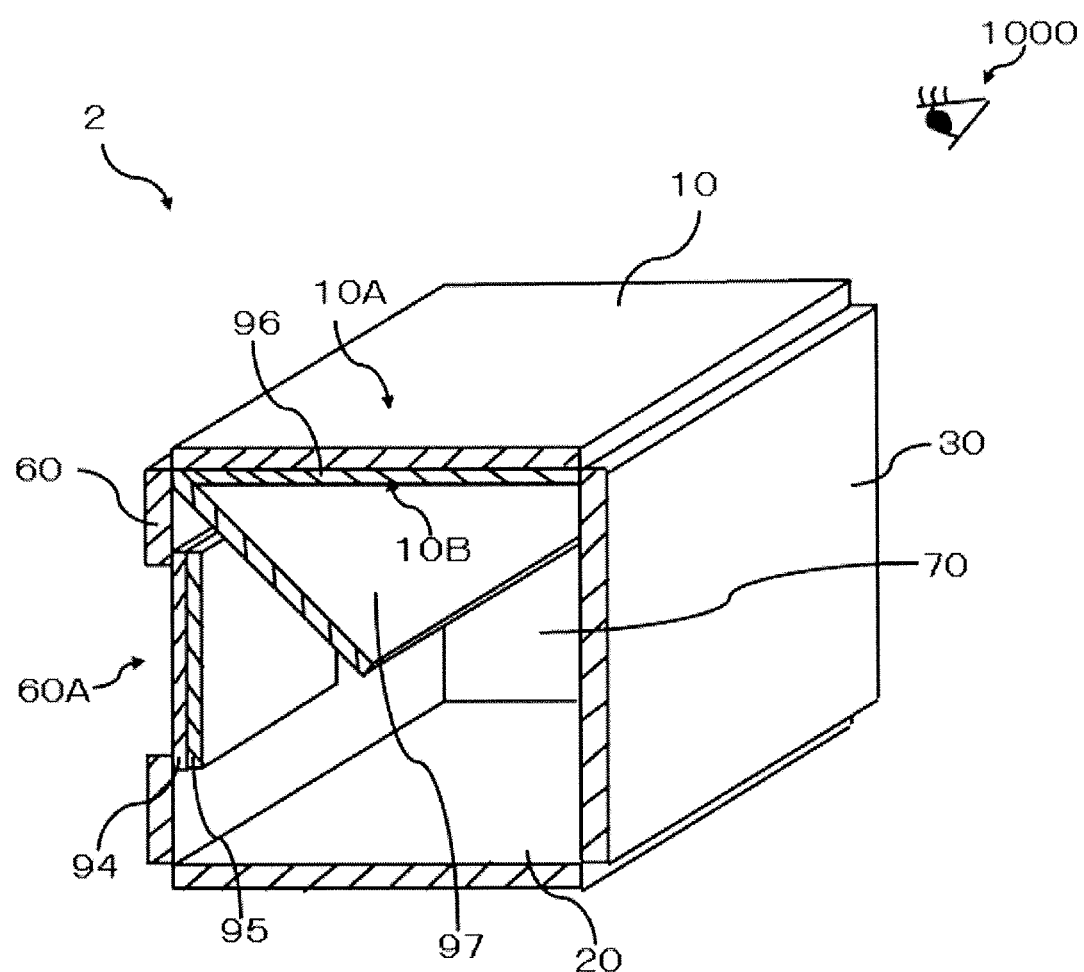

[FIG. 20]
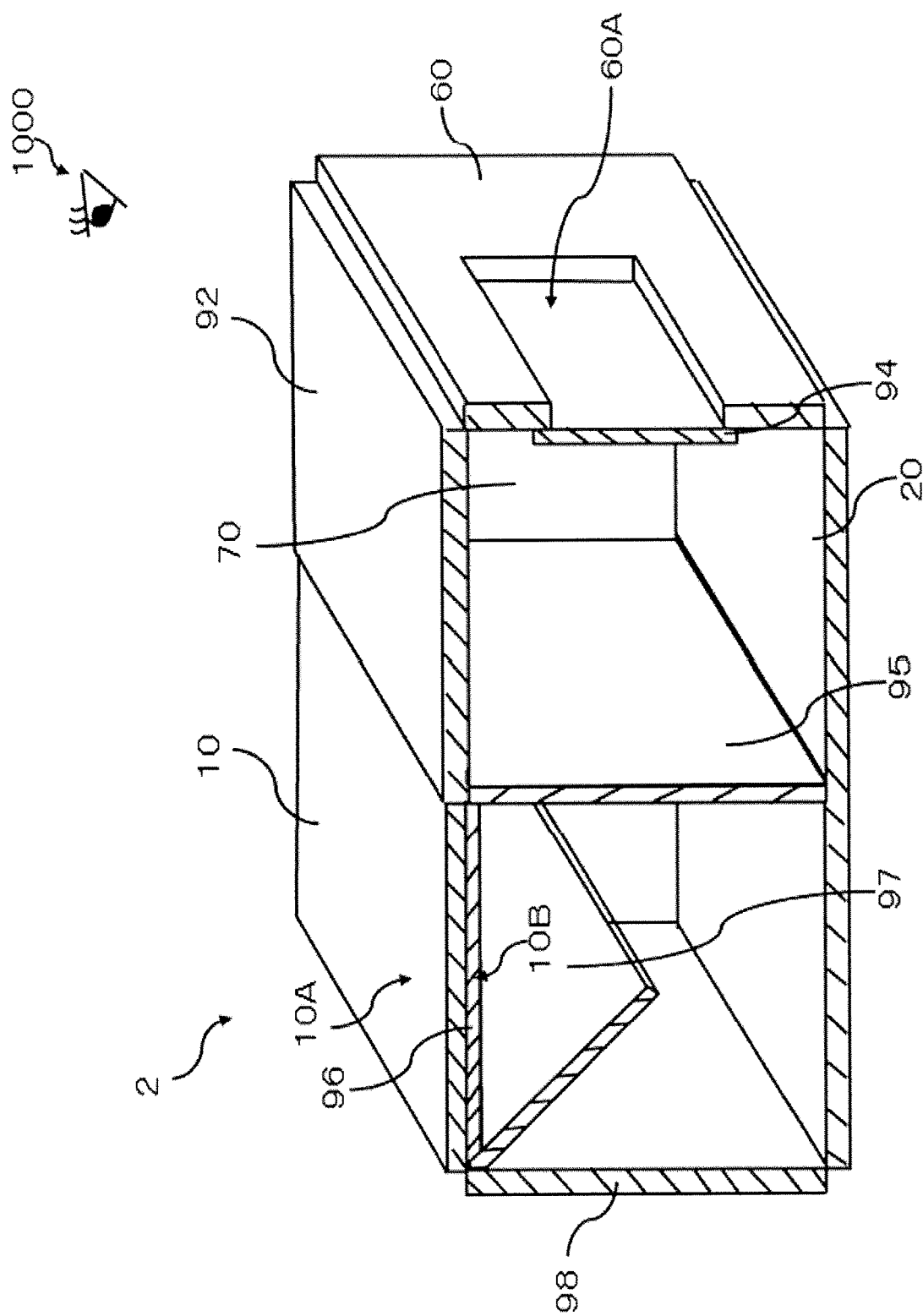

[ FIG. 21 ]
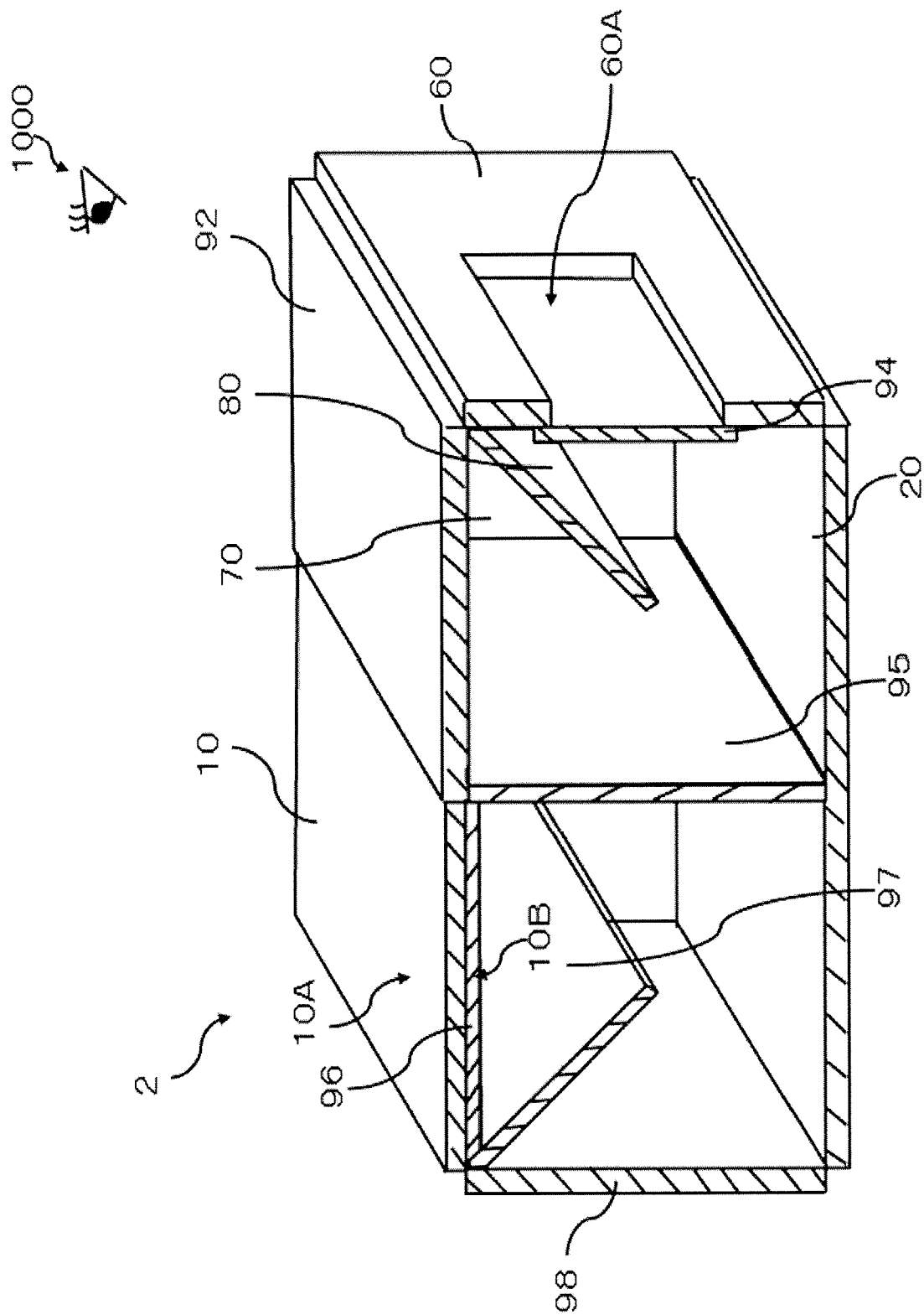

[ FIG. 22 ]
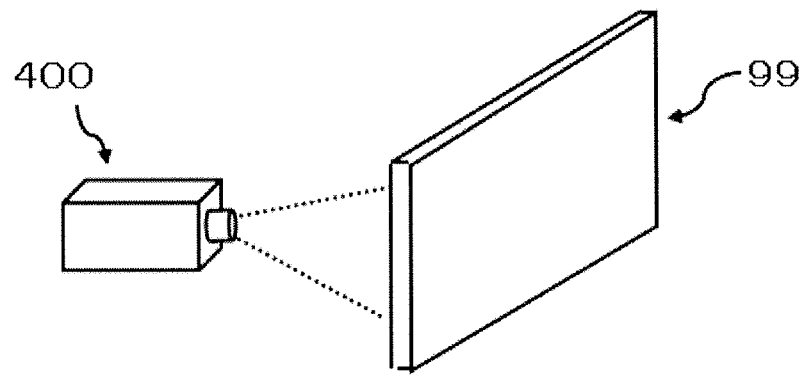

FLOATING IMAGE DISPLAY UNIT

CROSS REFERENCE TO RELATED APPLICATIONS

This application is a U.S. National Phase of International Patent Application No. PCT/JP2015/056646 filed on Mar. 6, 2015, which claims priority benefit of Japanese Patent Application No. 2014-072476 filed in the Japan Patent Office on Mar. 31, 2014. Each of the above-referenced applications is hereby incorporated herein by reference in its entirety.

TECHNICAL FIELD

The technology relates to a floating image display unit that displays an image in space.

BACKGROUND ART

Patent Literature 1 discloses an optical system that uses a plane-symmetric imaging element to form an image of an object at a plane-symmetric position on top-surface side with respect to the element. The object is disposed on bottom-surface side of the element. A substrate of the plane-symmetric imaging element used in the optical system is provided with a plurality of through holes arranged in a matrix, and an optical element including two mirrored surfaces that are orthogonal to each other is formed on an interior wall of each of the holes. When light outputted from the object passes through the holes, the light is reflected once by each of the two mirrored surfaces, and an image of the reflected light is formed at a plane-symmetric position with respect to the element. This causes an observer to see a formed image (a real image) as if the image is floating above the top surface of the element.

CITATION LIST

Patent Literature

Patent Literature 1: Japanese Unexamined Patent Application Publication No. 2008-158114

SUMMARY OF INVENTION

In the optical system described in Patent Literature 1, a floating height of the real image from the top surface of the element is equal to a distance between the object and the bottom surface of the element. Therefore, in order to increase the foregoing floating height, it is necessary to move the object away from the bottom surface of the element accordingly. This causes an issue of an increase in volumetric capacity of the optical system.

It is therefore desirable to provide a floating image display unit that makes it possible to reduce a thickness of an optical system, as compared with a floating height of a real image.

A floating image display unit according to an embodiment of the technology includes an optical plate and one or a plurality of reflectors. The optical plate includes a plurality of optical elements arranged in a matrix on a substrate having a normal in a Z-axis direction, and each of the optical elements is configured to regularly reflect an entering light beam of a Z-axis direction component and recursively reflect an entering light beam of an XY-axis direction component. The one or the plurality of reflectors are configured to reflect light outputted from a light emitter or a light irradiation target object disposed on the rear surface side of the optical plate, thereby causing the light to obliquely enter a rear surface of the optical plate, where a surface on viewer side of the optical plate is denoted as a front surface and a surface opposite to the front surface of the optical plate is denoted as the rear surface.

In the floating image display unit according to the embodiment of the technology, the light outputted from the light emitter or the light irradiation target object disposed on the rear surface side of the optical plate is reflected by the one or the plurality of reflectors to obliquely enter the rear surface. As used herein, the term "symmetric position" refers to a plane-symmetric position to a real image with respect to the optical plate. The real image is formed on the front surface side of the optical plate as a result of reflecting the light outputted from the light emitter or the light irradiation target object by the one or the plurality of reflectors and thereafter causing the light to pass through the optical plate from the rear surface side. At this occasion, for example, one reflector (a first reflector) is provided between the symmetric position and the plurality of optical elements to cause the light from the light emitter or the light irradiation target object to enter the first reflector from a position above the symmetric position, which makes it possible to form the foregoing real image. In other words, even if the light emitter or the light irradiation target object does not exist at the symmetric position, it is possible to form the foregoing real image as if the light emitter or the light irradiation target object exists at the symmetric position. As a result, it is possible to dispose the light emitter or the one or the plurality of reflectors closer to the rear surface of the optical plate than the symmetric position.

According to the floating image display unit of the embodiment of the technology, providing the one or the plurality of reflectors makes it possible to dispose the light emitter or the one or the plurality of reflectors closer to the rear surface of the optical plate than the symmetric position; therefore, it is possible to reduce a thickness of the floating image display unit, as compared with a floating height of the real image. It is to be noted that effects of the technology are not limited to effects described here, and may be any of effects described in the description.

BRIEF DESCRIPTION OF DRAWINGS

FIG. 1 is a diagram of an example of a cross-sectional configuration of a floating image display unit according to a first embodiment of the technology.

FIG. 2 is a diagram of an example of a planar configuration of an optical plate in FIG. 1.

FIG. 3 is a diagram of an example of workings of the optical plate in FIG. 1 in an XY plane.

FIG. 4 is a diagram of an example of workings of the optical plate in FIG. 1 in an XZ plane and a YZ plane.

FIG. 5 is a diagram of an example of workings of the floating image display unit in FIG. 1.

FIG. 6 is a diagram of a modification example of the floating image display unit in FIG. 1.

FIG. 7 is a diagram of an example of workings of the floating image display unit in FIG. 6.

FIG. 8 is a diagram of a modification example of the floating image display unit in FIG. 1.

FIG. 9 is a diagram of a modification example of the floating image display unit in FIG. 6.

FIG. 10 is a diagram of an example of a cross-sectional configuration of a floating image display unit according to a second embodiment of the technology.

FIG. 11 is a diagram of an example of workings of the floating image display unit in FIG. 10.

FIG. 12 is a diagram of a modification example of the floating image display unit in FIG. 11.

FIG. 13 is a diagram of an example of workings of the floating image display unit in FIG. 12.

FIG. 14 is a diagram of a modification example of the floating image display unit in FIG. 13.

FIG. 15 is a diagram of a modification example of the floating image display unit in FIG. 1.

FIG. 16 is a diagram of a modification example of the floating image display unit in FIG. 8.

FIG. 17 is a diagram of a modification example of the floating image display unit in FIG. 6.

FIG. 18 is a diagram of a modification example of the floating image display unit in FIG. 9.

FIG. 19 is a diagram of a modification example of the floating image display unit in FIG. 10.

FIG. 20 is a diagram of a modification example of the floating image display unit in FIG. 12.

FIG. 21 is a diagram of a modification example of the floating image display unit in FIG. 14.

FIG. 22 is a diagram of an example of an alternative to a display panel.

MODE FOR CARRYING OUT THE INVENTION

In the following, some embodiments of the technology are described in detail with reference to the drawings. It is to be noted that description is given in the following order.
1. First Embodiment (FIGS. 1 to 5)
    An example containing two reflectors and a light emitter
2. Modification Examples of First Embodiment (FIGS. 6 to 9)
    Modification Example A: An example in which the position of the light emitter is changed
    Modification Example B: An example including a light-shielding plate
3. Second Embodiment (FIGS. 10 and 11)
    An example containing one polarizer, two polarization reflectors, and a half-wave plate in addition to the two reflectors and the light emitter
4. Modification Examples of Second Embodiment (FIGS. 12 to 15)
    Modification Example C: An example in which the position of the light emitter is changed
    Modification Example D: An example including a light-shielding plate
5. Common Modification Examples of Respective Embodiments and Modification Examples (FIGS. 16 to 22)
    Modification Example E: An example in which the light emitter is externally attached
    Modification Example F: An example in which a translucent screen is provided in place of a display panel (1. First Embodiment)
[Configuration]
FIG. 1 illustrates an example of a cross-sectional configuration of a floating image display unit 1 according to a first embodiment of the technology. The floating image display unit 1 displays an image in space. The floating image display unit 1 may include, for example, an optical plate 10, reflectors 20 and 30, a display panel 40, a driving circuit board 50, and supporting plates 60 and 70. The optical plate 10, the reflectors 20 and 30, the display panel 40, and the supporting plates 60 and 70 form internal space. The supporting plates 60 and 70 may be omitted as necessary. The optical plate 10 corresponds to a specific example of an "optical plate" of the technology. The reflectors 20 and 30 correspond to a specific example of a "plurality of reflectors" of the technology. The reflector 20 corresponds to a specific example of a "second reflector" of the technology. The reflector 30 corresponds to a specific example of a "first reflector" of the technology. The display panel 40 corresponds to a specific example of "light emitter" of the technology.

(Optical Plate 10)
FIG. 2 illustrates an example of a planar configuration of the optical plate 10. The optical plate 10 includes a plate-like substrate 11. As used herein, a surface on viewer 1000 side of the optical plate 10 (the substrate 11) is denoted as a front surface 10A, and a surface opposite to the front surface 10A of the optical plate 10 (the substrate 11) is denoted as a rear surface 10B. Moreover, a plane parallel to the front surface 10A of the optical plate 10, a plane parallel to a reflective surface 13A to be described later, and a plane parallel to a reflective surface 13B to be described later are respectively denoted as an XY plane, as an XZ plane, and an YZ plane. Further, a normal AX1 to the optical plate 10 (the substrate 11) is parallel to a Z axis.

The optical plate 10 (the substrate 11) includes a plurality of apertures 12 arranged in a matrix in a plane parallel to the front surface 10A. Each of the apertures 12 penetrates through the optical plate 10 in a thickness direction (a Z-axis direction), and allows light entering from the rear surface 10B side of the optical plate 10 to pass therethrough to the front surface 10A side of the optical plate 10. A diameter of each of the apertures 12 may be, for example, submicron (smaller than 1 μm), in μm order (from 1 μm to 999 μm), or in mm order (from 1 mm to 9 mm). Each of the apertures 12 may be, for example, an air gap. For example, the substrate 11 may have the apertures 12. A projected structure formed on the front surface 10A of the substrate 11 may have the apertures 12. The optical plate 10 (the substrate 11) may include a light-shielding (light-reflective or light-absorbent) member in a region other than a region where each of the apertures 12 is formed.

An optical element 13 may be provided on a side surface of each of the apertures 12. In other words, the optical plate 10 includes a plurality of optical elements 13 arranged in a matrix in a plane parallel to the front surface 10A. Each of the optical elements 13 may include, for example, two reflective surfaces 13A and 13B that are orthogonal to each other. The reflective surface 13A is parallel to the XZ plane, and the reflective surface 13B is parallel to the YZ plane. The reflective surface 13A and the reflective surface 13B may be provided in a same layer or in different layers in the optical plate 10. In a case in which the reflective surface 13A and the reflective surface 13B are provided in the same layer in the optical plate 10, for example, an end of the reflective surface 13A is in contact with an end of the reflective surface 13B. In a case in which the reflective surface 13A and the reflective surface 13B are provided in different layers in the optical plate 10, for example, one of four corners of the reflective surface 13A is in contact with one of four corners of the reflective surface 13B.

FIG. 3 illustrates an example of workings of the optical plate 10 in the XY plane. FIG. 4 illustrates an example of workings of the optical plate 10 in the XZ plane and in the YZ plane. In the XY plane, light L having entered from the rear surface 10B side of the optical plate 10 may enter the reflective surface 13A at an entry angle $\theta$ and may be reflected at an exit angle $\theta$ by the reflective surface 13A, and thereafter, the light L may enter the reflective surface 13B at an entry angle $\varphi$ and may be reflected at an exit angle $\varphi$ by the reflective surface 13B. Consequently, light having entered the reflective surface 13A at an angle other than directions of normals to the reflective surfaces 13A and 13B is returned, by the reflective surfaces 13A and 13B, to a direction from which the light L has come. At this occasion, in each of the optical elements 13, a misalignment Δd between an optical axis of light having entered the optical element 13 and an optical axis of light having been returned through reflection by the optical element 13 is smaller than the diameter of the aperture 12. Accordingly, in a case in which each of the apertures 12 has a diameter to the above-described extent, an XY-axis direction component of light having entered the reflective surface 13A at an angle other than the directions of the normals to the reflective surfaces 13A and 13B is recursively reflected by the reflective surfaces 13A and 13B.

In contrast, in the XZ plane and the YZ plane, the light L having entered from the rear surface 10B side of the optical plate 10 may enter the reflective surface 13A at an entry angle ψ and may be reflected at an exit angle ψ by the reflective surface 13A, and thereafter, the light L may enter the reflective surface 13B at the entry angle ψ and may be reflected at the exit angle ψ by the reflective surface 13B to be outputted to the front surface 10A side of the optical plate 10. Consequently, in the Z-axis direction, recursive reflection by the reflective surfaces 13A and 13B does not occur. As described above, each of the optical elements 13 regularly reflects an entering light beam of a Z-axis direction component parallel to the normal AX1 to the optical plate 10 (the substrate 11), and recursively reflects an entering light beam of an XY-axis direction component parallel to the rear surface 10B of the optical plate 10.

For example, in a case in which a light emitter or a light irradiation target object that outputs divergent light is disposed on the rear surface 10B side of the optical plate 10, the divergent light outputted from the light emitter or the light irradiation target object passes through the optical plate 10, and thereafter the divergent light is converged (an image of the divergent light is formed) at a plane-symmetric position to a position of the light emitter and the light irradiation target object with respect to the optical plate 10. Accordingly, the optical plate 10 functions as a plane-symmetric imaging element that converges (forms an image of) divergent light having entered the optical plate 10 from the light emitter or the light irradiation target object at the plane-symmetric position to the position of the light emitter or the light irradiation target object with respect to the optical plate 10.

(Reflectors 20 and 30)

FIG. 5 illustrates an example of workings of the floating image display unit 1. The reflectors 20 and 30 each reflect light outputted from the display panel 40 that is disposed at a predetermined position on the rear surface 10B side of the optical plate 10, thereby causing the light to obliquely enter the rear surface 10B in a form of divergent light. As used herein, the term "real image 100" refers to an image that is formed on the front surface 10A side of the optical plate 10 as a result of reflecting the light outputted from the display panel 40 by the reflectors 20 and 30 and thereafter causing the light to pass through the optical plate 10 from the rear surface 10B side. Moreover, the term "symmetric position 200" refers to a plane-symmetric position to the real image 100 with respect to a plane including the optical plate 10. At this occasion, the reflectors 20 and 30 are disposed on the rear surface 10B side of the optical plate 10, and are disposed closer to the rear surface 10B than the symmetric position 200.

The reflector 30 is disposed between the symmetric position 200 and the plurality of optical elements 13 in the optical plate 10. In other words, the reflector 30 reflects, toward the plurality of optical elements 13, light entering from a direction of a plane-symmetric position (a symmetric position 300) to the symmetric position 200 with respect to a plane including the reflector 30. The reflector 30 is disposed in the same layer as a clearance present between the rear surface 10B and the reflector 20, and is disposed in parallel to or oblique to the normal AX1 to the optical plate 10 (the substrate 11). FIGS. 1 and 5 each exemplify a state in which the reflector 30 is disposed in parallel to the normal AX1.

The reflector 20 is disposed between the reflector 30 and the symmetric position 300. In other words, the reflector 20 reflects, toward the reflector 30, light entering from a direction of a plane-symmetric position to the symmetric position 300 with respect to a plane including the reflector 20. The reflector 20 is disposed to be opposed to the rear surface 10B with a predetermined air gap (internal space) in between, and is disposed in parallel to or oblique to the rear surface 10B. FIGS. 1 and 5 each exemplify a state in which the reflector 20 is disposed in parallel to the rear surface 10B. The reflectors 20 and 30 may be preferably disposed orthogonal to each other. Moreover, it may be preferable that the reflector 20 be disposed in parallel to the rear surface 10B and the reflector 30 be disposed in parallel to the normal AX1.

(Display Panel 40)

The display panel 40 is a flat-shaped panel that displays an image, based on an image signal to be inputted from outside. The display panel 40 may be, for example, one of a liquid crystal panel, an organic EL panel, and an inorganic EL panel. The display panel 40 includes an image display surface 40A where a plurality of pixels are arranged in a matrix. Each of the pixels outputs divergent light having a predetermined divergent angle. The display panel 40 outputs divergent light from the image display surface 40A. The light outputted from the display panel 40 enters the rear surface 10B of the optical plate 10 through the internal space of the floating image display unit 1.

The display panel 40 is disposed at a predetermined position on the rear surface 10B side of the optical plate 10. The display panel 40 is disposed at a position where light outputted from the display panel 40 is allowed to be reflected by the reflective surface 20. Further, the display panel 40 is disposed at a position where the light outputted from the display panel 40 is allowed to be reflected once by each of the reflective surfaces 20 and 30. More specifically, the display panel 40 is disposed at a position where the light outputted from the display panel 40 is allowed to be reflected once by each of the reflective surfaces 20 and 30 and obliquely enter the rear surface 10B. The display panel 40 is disposed at a plane-symmetric position to the symmetric position 300 with respect to the plane including the reflector 20. Accordingly, the display panel 40 may be disposed above the plane including the optical plate 10, or may be disposed in the same layer as a clearance present between the rear surface 10B and the reflector 13A as illustrated in FIGS. 1 and 5. The display panel 40 is disposed in parallel to or oblique to the normal AX1 to the optical plate 10 (the substrate 11). FIGS. 1 and 5 each exemplify a state in which the display panel 40 is disposed in parallel to the normal AX1.

(Driving Circuit Board 50 and Supporting Plates 60 and 70)

The driving circuit board 50 drives the display panel 40, based on an image signal to be inputted from outside. The supporting plate 60 supports the display panel 40. The supporting plate 60 may be disposed in the same plane as the display panel 40, for example, and may support the display panel 40, for example, by fitting the display panel 40 into an aperture provided in the supporting plate 60. In a case in which the display panel 40 has a size substantially equal to that of the reflector 30, the supporting plate 60 may be omitted. The supporting plate 70 may support, for example, the optical plate 10, the reflectors 20 and 30, the display panel 40, and the supporting plate 60. In a case in which the optical plate 10, the reflectors 20 and 30, the display panel 40, and the supporting plate 60 make it possible to maintain internal space of the floating image display unit 1 without support by the supporting plate 70, the supporting plate 70 may be omitted. The supporting plates 60 and 70 may each include a light-absorbent member.

[Workings and Effects]

Next, description is given of workings and effects of the floating image display unit with reference to FIG. 5.

Divergent light outputted from the display panel 40 is reflected once by each of the reflectors 20 and 30 to obliquely enter the rear surface 10B of the optical plate 10. A Z-axis direction component parallel to the normal AX1 to the optical plate 10 (the substrate 11) of the light having obliquely entered the rear surface 10B of the optical plate 10 is reflected, and an XY-axis direction component parallel to the rear surface 10B of the optical plate 10 of the light is recursively reflected. The light having passed through the optical plate 10 in such a manner is converged (an image of the light is formed) at a plane-symmetric position to the symmetric position 200 with respect to the plane including the optical plate 10 to form the real image 100. Even if the display panel 40 does not exist at the symmetric position 200, the real image 100 is formed as if the display panel 40 exists at the symmetric position 200.

Incidentally, in the embodiment, the reflectors 20 and 30 are provided, which causes light outputted from the display panel 40 to be reflected twice until the light reaches the rear surface 10B of the optical plate 10. Accordingly, an optical path OP1 of the light outputted from the display panel 40 until reaching the rear surface 10B of the optical plate 10 is not in a straight line, but is bent at two points. If the display panel 40 is disposed at the symmetric position 200 and the reflectors 20 and 30 are omitted, an optical path OP2 of the light outputted from the display panel 40 until reaching the rear surface 10B of the optical plate 10 is in a straight line. At this occasion, the position (the symmetric position 200) of the display panel 40 is located farther from the rear surface 10B of the optical plate 10 than the original position of the display panel 40 in the embodiment.

Herein, a distance from the rear surface 10B of the optical plate 10 to a lower end of the symmetric position 200 (that is, a sinking amount H2 of the symmetric position 200) is equal to a distance from the front surface 10A of the optical plate 10 to an upper end of the real image 100 (that is, a floating height H1 of the real image 100). Accordingly, the floating height H1 is represented by the following expression, where a thickness in the Z-axis direction of the floating image display unit 1 is h:

$$H1=H2=2h$$

As described above, in the embodiment, the floating height H1 of the real image 100 is twice as large as the thickness h in the Z-axis direction of the floating image display unit 1. Accordingly, in the embodiment, providing the reflectors 20 and 30 makes it possible to reduce the thickness h in the Z-axis direction of the floating imaging display unit 1, as compared with the floating height H1 of the real image 100.

Moreover, in the embodiment, in a case in which the optical plate 10 (the substrate 11) includes a light-shielding (light-reflective or light-absorbent) member in a region other than a region where each of the apertures 12 is formed, it is possible to reduce leakage of light not contributing to formation of the real image 100 to outside. As a result, display quality of the real image is improved.

Further, in the embodiment, the floating image display unit 1 may include a mechanism that turns the direction of the display panel 40. Providing such a mechanism makes it possible to turn the direction of the display panel 40 in response to, for example, contents of an image to be displayed on the image display surface 40A and a direction of a line of sight of a viewer 1000.

2. Modification Examples of First Embodiment

[Modification Example A]

FIG. 6 illustrates a modification example of the floating image display unit 1 of the foregoing embodiment. In this modification example, the reflector 30 is omitted, and the reflector 20, the display panel 40, and the supporting plate 60 are disposed at a plane-symmetric position with respect to a position where the reflector 30 is disposed in the floating image display unit 1 of the foregoing embodiment. At this occasion, the display panel 40 is disposed at a position where light outputted from the display panel 40 is allowed to be reflected by the reflector 20. As with the foregoing embodiment, the reflector 20 is disposed in parallel to or oblique to the rear surface 10B. FIG. 6 illustrates an example in which the reflector 20 is disposed in parallel to the rear surface 10B.

Moreover, a supporting plate 91 is provided at a position where the display panel 40 and the supporting plate 60 are provided in the foregoing embodiment, and a supporting plate 92 is provided at a position opposed to the reflector 20 in the same plane as the optical plate 10. A supporting plate 93 is provided at a position where the reflector 20 is provided in the foregoing embodiment. The supporting plates 91, 92, and 93 form internal space of the floating image display unit 1 together with the optical plate 10, the reflector 20, the display panel 40, and the supporting plates 60 and 70. One or more of the supporting plates 91, 92, and 93 may be omitted as necessary. The supporting plates 91, 92, and 93 may each include a light-absorbent member, for example.

FIG. 7 illustrates an example of workings of the floating image display unit 1 of this modification example. In this modification example, the reflector 20 and the display panel 40 are disposed at plane-symmetric positions with respect to the position where the reflector 30 is provided in the floating image display unit 1 of the foregoing embodiment. Accordingly, divergent light outputted from the display panel 40 is reflected by the reflector 20 to obliquely enter the rear surface 10B of the optical plate 10. The Z-axis direction component parallel to the normal AX1 to the optical plate 10 (the substrate 11) of the light having obliquely entered the rear surface 10B of the optical plate 10 is reflected, and the XY-axis direction component parallel to the rear surface 10B of the optical plate 10 of the light is recursively reflected. The light having passed through the optical plate 10 in such a manner is converged (an image of the light is formed) at a plane-symmetric position to the symmetric position 200 with respect to the plane including the optical plate 10 to form the real image 100. Thus, even if the display panel 40 does not exist at the symmetric position 200, the real image 100 is formed as if the display panel 40 exists at the symmetric position 200. Accordingly, in this modification example, it is possible to reduce the number of optical components by one, as compared with the foregoing embodiment, while achieving effects similar to those of the foregoing embodiment.

It is to be noted that, in this modification example, the reflector 20 may be disposed not only at a position adjacent to a position opposed to the optical plate 10 but also at a position where the supporting plate 93 is formed. In other words, the reflector 20 may be provided in place of the supporting plate 93. In this case, however, the supporting plate 91 may preferably have a function of absorbing light outputted from the display panel 40.

[Modification Example B]

FIG. 8 illustrates a modification example of the floating image display unit 1 of the foregoing embodiment. FIG. 9 illustrates a modification example of the floating image display unit 1 of the foregoing modification example A. In this modification example, the floating image display unit 1 further includes a light-shielding plate 80 between the display panel 40 and the plurality of optical elements 13. The light-shielding plate 80 has a function of absorbing light outputted from the display panel 40. The light-shielding plate 80 may be supported by the supporting plate 70, for example.

In general, light outputted from the display panel 40 is Lambert light, and diverges at an extremely wide angle. The light-shielding plate 80 prevents light beams from reaching the respective optical elements 13 of the optical plate 10 directly from the display panel 40. If light beams directly enter the respective optical elements of the optical plate 10, the same image as the foregoing real image 100 is formed as a ghost at a position lower than the floating height of the real image 100.

Light necessary to form the ghost may propagate between a line segment L1 illustrated in FIGS. 8 and 9 and a line segment L2 illustrated in FIGS. 8 and 9. Accordingly, the light-shielding plate 80 makes it possible to prevent formation of the ghost by shielding a component of the light outputted from the display panel 40. The component of the light outputted from the display panel 40 propagates between the line segment L1 illustrated in FIGS. 8 and 9 and the line segment illustrated in FIGS. 8 and 9 to reach the rear surface 10B of the optical plate 10. Herein, the line segment L1 is a line segment that connects, with a straight line, a lower end of the image display surface 40A (an end farthest from the rear surface 10B) and a part farthest from the display panel 40 (a farthest part) of a region in which the respective optical elements 13 are formed in the optical plate 10. The line segment L2 is a line segment that connects, with a straight line, an upper end of the image display surface 40A (an end closest to the rear surface 10B) and a part closest to the display panel 40 (a closest part) of the region in which the respective optical elements 13 are formed in the optical plate 10.

However, it may be preferable not to shield, by the light-shielding plate 80, a component necessary to form the real image 100 of the light outputted from the display panel 40. For example, it may be preferable not to shield, by the light-shielding plate 80, a component propagating along a line segment L3 illustrated in FIGS. 8 and 9 of the light outputted from the display panel 40. Herein, the line segment L3 may be a line segment corresponding to an optical path where a component, which is reflected by the reflectors 20 and 30 to enter the foregoing closest part, of the light outputted from the upper end (the end closest to the rear surface 10B) of the image display surface 40A propagates. In a case in which the reflector 30 is omitted, the line segment L3 is a line segment corresponding to an optical path where a component, which is reflected by the reflector 20 to enter the foregoing farthest part, of the light outputted from the upper end (the end closest to the rear surface 10B) of the image display surface 40A propagates.

Accordingly, the light-shielding plate 80 may be preferably disposed at a position where the component, which propagates between the line segment L1 and the line segment L2 to reach the rear surface 10B of the optical plate 10, of the light outputted from the display panel 40 is allowed to be shielded and the component propagating along the line segment L3 of the light is allowed not to be shielded. In such a case, formation of an unnecessary ghost is preventable without lacking the real image 100 and without sacrificing brightness.

(3. Second Embodiment)

[Configuration]

Next, description is given of a floating image display unit 2 according to a second embodiment of the technology. FIG. 10 illustrates an example of a cross-sectional configuration of the floating image display unit 2. The floating image display unit 2 displays an image in space. The floating image display unit 2 is similar to the floating image display unit 1 of the foregoing embodiment, except that a polarizer 94, polarization reflectors 95 and 96, and a half-wave plate 97 are further provided. The polarizer 94 corresponds to a specific example of a "polarizer" of the technology. The polarization reflector 95 corresponds to a specific example of a "first polarization reflector" of the technology. The polarization reflector 96 corresponds to a specific example of a "second polarization reflector" of the technology. The half-wave plate 97 corresponds to a specific example of a "half-wave plate" of the technology.

The polarizer 94 allows one polarized light (first polarized light) of p-polarized light and s-polarized light to pass therethrough, and absorbs or reflects the other polarized light (second polarized light). The polarization reflector 95 allows the first polarized light to pass therethrough and reflects the second polarized light. The polarization reflector 96 allows the second polarized light to pass therethrough and reflects the first polarized light. The half-wave plate converts p-polarized light into s-polarized light, or converts s-polarized light into p-polarized light. The polarizer 94, the polarization reflector 95, the polarization reflector 96, and the half-wave plate 97 are disposed to allow the light outputted from the display panel 40 to enter the rear surface 14B through the polarizer 94, the polarization reflector 95, the polarization reflector 96, the half-wave plate 97, the polarization reflector 95, and the polarization reflector 96.

The polarizer 94 and the polarization reflector 95 may be disposed in contact with or in proximity to the image display surface 40 of the display panel 40 while being superimposed on each other, for example. The polarization reflector 96 is disposed in contact with or in proximity to the rear surface 14B. The half-wave plate 98 is disposed at the same position as the light-shielding plate 80 described in the foregoing modification example B. More specifically, for example, the half-wave plate 98 may be disposed at a position where a component, which propagates between the line segment L1 and the line segment L2 to reach the polarization reflector 95, of the first polarized light reflected by the polarization reflector 96 is allowed to pass therethrough and a component propagating along the line segment L3 of the light outputted from the display panel 40 is allowed not to be shielded. The half-wave plate 98 may be supported by the supporting plate 70, for example.

[Workings and Effects]

Next, description is given of workings and effects of the floating image display unit 2 with reference to FIG. 11.

FIG. 11 illustrates an example of working of the floating image display unit 2. The first polarized light included in the divergent light outputted from the display panel 40 passes through the polarizer 94 and the polarization reflector 95, and thereafter is reflected once by each of the reflectors 20 and 30 to enter the polarization reflector 96. The first polarized light having entered the polarization reflector 96 is reflected by the polarization reflector 96, and thereafter is converted into the second polarized light by the half-wave plate 98. The second polarized light having passed through the half-wave plate 98 is reflected once by each of the polarization reflector 95 and the reflectors 20 and 30 and passes through the polarization reflector 96, and thereafter, the second polarized light obliquely enters the rear surface 10B of the optical plate 10.

The Z-axis direction component parallel to the normal AX1 to the optical plate 10 (the substrate 11) of the light having obliquely entered the rear surface 10B of the optical plate 10 is reflected, and the XY-axis direction component parallel to the rear surface 10B of the optical plate 10 of the light is recursively reflected. The light having passed through the optical plate 10 in such a manner is converged (an image of the light is formed) at the plane-symmetric position to the symmetric position 200 with respect to the plane including the optical plate 10 to form the real image 100. Even if the display panel 40 does not exist at the symmetric position 200, the real image 100 is formed as if the display panel 40 exists at the symmetric position 200.

Incidentally, in the embodiment, as compared with the case with the floating image display unit 1 of the first embodiment, reflection is performed four times more. Accordingly, an optical path length is increased by four times of reflection. The floating height H1 of the real image 100 is represented by the following expression:

H1=H2=4h

As described above, in the embodiment, the floating height H1 of the real image 100 is four times as large as the thickness h in the Z-axis direction of the floating image display unit 2. If the display panel 40 is disposed at the symmetric position without using the reflectors 20 and 30, the thickness h in the Z-axis direction of the floating image display unit 2 is equal to the floating height H1 of the real image 100. Accordingly, in the embodiment, providing the reflectors 20 and 30 makes it possible to reduce the thickness h in the Z-axis direction of the floating image display unit 2, as compared with the floating height H1 of the real image 100.

Moreover, in the embodiment, for example, the polarizer 94, the polarization reflector 95, the polarization reflector 96, and the half-wave plate 97 are disposed in the internal space of the floating image display unit 2, as illustrated in FIG. 10. This makes it possible to minimize an increase in volumetric capacity of the floating image display unit 2 that is caused by providing the polarizer 94, the polarization reflector 95, the polarization reflector 96, and the half-wave plate 97.

(4. Modification Examples of Second Embodiments)

[Modification Example C]

FIG. 12 illustrates a modification example of the floating image display unit 2 of the foregoing second embodiment. In this modification example, the reflector 30 is omitted, and the reflector 20, the display panel 40, and the supporting plate 60 are disposed at plane-symmetric positions with respect to the position where the reflector 30 is provided in the floating image display unit 2 of the foregoing second embodiment. Moreover, a reflector 98 is provided at a position where the display panel 40 and the supporting plate 60 are provided in the foregoing second embodiment, and the supporting plate 92 is provided at a position opposed to the reflector 20 in the same plane as the optical plate 10. The reflector 20 is provided also at a position where the reflector 20 is provided in the foregoing second embodiment. The supporting plate 92 and the reflector 98 form internal space of the floating image display unit 2 together with the optical plate 10, the reflector 20, the display panel 40, and the supporting plates 60 and 70.

FIG. 13 illustrates an example of workings of the floating image display unit 2 of this modification example. In this modification example, the reflector 20 and the display panel 40 are disposed at plane-symmetric positions with respect to the position where the reflector 30 is provided in the floating image display unit 2 of the foregoing second embodiment. Accordingly, divergent light outputted from the display panel 40 is reflected by the reflector 20 to enter the polarization reflector 95. The first polarized light included in the light having entered the polarization reflector 95 passes through the polarization reflector 95, and thereafter is reflected by the polarization reflector 96. The first polarized light reflected by the polarization reflector 96 is converted into the second polarized light by the half-wave plate 98. The second polarized light having passed through the half-wave plate 98 is reflected once by each of the reflector 20 and the polarization reflector 95 and passes through the polarization reflector 96, and thereafter, the second polarized light obliquely enters the rear surface 10B of the optical plate 10.

The Z-axis direction component parallel to the normal AX1 to the optical plate 10 (the substrate 11) of the light having obliquely entered the rear surface 10B of the optical plate 10 is reflected, and the XY-axis direction component parallel to the rear surface 10B of the optical plate 10 of the light is recursively reflected. The light having passed through the optical plate 10 in such a manner is converged (an image of the light is formed) at the plane-symmetric position to the symmetric position 200 with respect to the plane including the optical plate 10 to form the real image 100. Even if the display panel 40 does not exist at the symmetric position 200, the real image 100 is formed as if the display panel 40 exists at the symmetric position 200. Accordingly, in this modification example, it is possible to achieve effects similar to those in the foregoing second embodiment.

[Modification Example D]

FIG. 14 illustrates a modification example of the floating image display unit 1 of the foregoing modification example C. In this modification example, the floating image display unit 2 further includes a light-shielding plate 80 between the display panel 40 and the plurality of optical elements 13. The light-shielding plate 80 has a function of absorbing light outputted from the display panel 40. The light-shielding plate 80 may be supported by the supporting plate 70, for example.

As with the foregoing modification example B, the light-shielding plate 80 may be preferably provided at a position where the component, which propagates between the line segment L1 and the line segment L2 to reach the rear surface 10B of the optical plate 10, of the light outputted from the display panel 40 is allowed to be shielded and the component propagating along the line segment L3 of the light is allowed not to be shielded. In such a case, formation of an unnecessary ghost is preventable without lacking the real image 100 and without sacrificing brightness.

(5. Common Modification Examples of Respective Embodiments and Modification Examples)

[Modification Example E]

FIGS. 15 to 18 illustrate a common modification example of the floating image display units 1 of the foregoing first embodiment and the modification examples of the first embodiment. FIGS. 19 to 21 illustrate a common modification example of the floating image display units 2 of the foregoing second embodiment and the modification examples of the second embodiment. In this modification example, the display panel 40 and the driving circuit board 50 are omitted. In other words, in this modification example, the display panel 40 and the driving circuit board 50 are regarded as external components separately prepared when using the floating image display units 1 and 2.

In this modification example, each of the floating image display units 1 and 2 may preferably include a mechanism that aligns the display panel 40 at a position where the display panel 40 is to be disposed. As such a mechanism, for example, the supporting plate 60 may include an aperture 61A into which the display panel 40 is fit as illustrated in FIGS. 15 to 21. The aperture 61A is provided at a position where the display panel 40 is to be disposed in each of the floating image display units 1 and 2 of the foregoing respective embodiments and the modification examples of the embodiments.

Accordingly, in the floating image display unit 1 or 2 having the configuration of the foregoing modification example A or the foregoing modification example C, an example of the aperture 61A may have a configuration that allows the display panel 40 to be disposed at a position where light outputted from the display panel 40 is allowed to be reflected by the reflector 20. At this occasion, the display panel 40 is therefore disposed at the position where the light outputted from the display panel 40 is allowed to be reflected by the reflector 20.

Moreover, in the floating image display units 1 and 2 having the configurations of the foregoing respective embodiments, an example of the aperture 61A may have a configuration that allows the display panel 40 to be disposed at a position where the light outputted from the display panel 40 is allowed to be reflected once by each of the reflectors 20 and 30. At this occasion, the display panel 40 is therefore disposed at a position where the light outputted from the display panel 40 is allowed to be reflected by the reflector 20. Moreover, the display panel 40 is disposed at a position where the light outputted from the display panel 40 is allowed to be reflected once by each of the reflectors 20 and 30.

Further, in the floating image display units 1 and 2 having the configurations of the foregoing respective embodiments and the modification examples of the embodiments, an example of the aperture 61A may have a configuration that allows the display panel 40 to be disposed in the same layer as a clearance present between the rear surface 10B and the reflector 20. At this occasion, the display panel 40 is therefore disposed in the same layer as the clearance present between the rear surface 10B and the reflector 20.

[Modification Example F]

FIG. 22 illustrates an example of an alternative to the display panel 40. In the floating image display units 1 and 2 having the configurations of the foregoing respective embodiments and the modification examples of the embodiments, a translucent screen 99 having light transparency may be provided in place of the display panel 40. In this case, in the description of the foregoing respective embodiments and the modification examples of the embodiments, the display panel 40 is replaced by the translucent screen 99. When image light is applied from a projector 400 to an irradiation target surface of the translucent screen 99, the translucent screen 99 outputs the image light as divergent light from a surface (a rear surface) opposite to the irradiation target surface. Accordingly, the light outputted from the rear surface of the translucent screen 99 is Lambert light as with the light outputted from the image display surface 40A of the display panel 40. The translucent screen 99 corresponds to a specific example of a "light irradiation target object" of the technology.

The translucent screen 99 may be disposed at the position of the display panel 40 in place of the display panel 40, for example. The projector 400 is disposed at a position where the image light is allowed to be applied to the translucent screen 99. Note that the image light outputted from the projector 400 may be applied to the translucent screen 99 through a reflector. In this modification example, the floating image display units 1 and 2 may each include the projector 400, and may further include a reflector that guides, to the translucent screen 99, the image light outputted from the projector 400, in addition to the projector 400.

Although description has been made by giving the example embodiments and the modification examples as mentioned above, the technology is not limited to the above-mentioned example embodiments and modification examples and may be modified in a variety of ways. Note that the effects described in the description are merely examples, and effects achieved by the technology are not limited thereto. The technology may have effects other than the effects described in the description.

The technology may include the following configurations.

(1) A floating image display unit including:

an optical plate including a plurality of optical elements arranged in a matrix on a substrate having a normal in a Z-axis direction, each of the optical elements being configured to regularly reflect an entering light beam of an Z-axis direction component and recursively reflect an entering light beam of an XY-axis direction component; and one or a plurality of reflectors configured to reflect light outputted from a light emitter or a light irradiation target object, thereby causing the light to obliquely enter a rear surface of the optical plate, the light emitter or the light irradiation target object being disposed at a predetermined position on the rear surface side of the optical plate, where a surface on viewer side of the optical plate is denoted as a front surface and a surface opposite to the front surface of the optical plate is denoted as the rear surface.

(2) The floating image display unit according to (1), wherein a first reflector that is one of the one or the plurality of reflectors is disposed between a symmetric position and the plurality of optical elements, and the symmetric position is a plane-symmetric position to a real image with respect to a plane including the optical plate, the real image being formed on the front surface side of the optical plate as a result of reflecting the light outputted from the light emitter or the light irradiation target object by the one or the plurality of reflectors and thereafter causing the light to pass through the optical plate from the rear surface side.

(3) The floating image display unit according to (1) or (2), wherein the one or the plurality of reflectors are disposed on the rear surface side of the optical plate, and are disposed closer to the rear surface than the symmetric position.

(4) The floating image display unit according to any one of (1) to (3), wherein
the floating image display unit includes the first reflector,
the first reflector is disposed in parallel to or oblique to the rear surface, and
the light emitter or the light irradiation target object is disposed at a position where the light outputted from the light emitter or the light irradiation target object is allowed to be reflected by the first reflector.

(5) The floating image display unit according to (4), wherein the light emitter or the light irradiation target object is disposed in the same layer as a clearance present between the rear surface and the first reflector.

(6) The floating image display unit according to any one of (1) to (3), wherein
the floating image display unit includes the first reflector and the second reflector that are two of the reflectors,
the second reflector is disposed in parallel to or oblique to the rear surface,
the first reflector is disposed in parallel to or oblique to a normal to the first reflector in the same layer as a clearance present between the rear surface and the second reflector, and
the light emitter or the light irradiation target object is disposed at a position where the light outputted from the light emitter or the light irradiation target object is allowed to be reflected once by each of the first reflector and the second reflector.

(7) The floating image display unit according to (6), wherein the light emitter or the light irradiation target object is disposed in the same layer as a clearance present between the rear surface and the second reflector.

(8) The floating image display unit according to any one of (1) to (7), further including a light-shielding plate between the light emitter or the light irradiation target object and the plurality of optical elements.

(9) The floating image display unit according to any one of (1) to (7), further including the light emitter or the light irradiation target object on the rear surface side of the optical plate.

(10) The floating image display unit according to (9), wherein the light emitter is a display panel configured to display an image, based on an image signal to be inputted from outside.

(11) The floating image display unit according to (9), wherein the light irradiation target object is a translucent screen having light transparency.

(12) The floating image display unit according to any one of (1) to (11), further including:
a polarizer configured to allow one of p-polarized light and s-polarized light as first polarized light to pass therethrough and to absorb or reflect the other light as second polarized light;
a first polarization reflector that allows the first polarized light to pass therethrough and reflects the second polarized light;
a second polarization reflector that allows the second polarized light to pass therethrough and reflects the first polarized light; and
a half-wave plate.

(13) The floating image display unit according to (12), wherein the polarizer, the first polarization reflector, the second polarization reflector, and the half-wave plate are disposed to allow the light outputted from the light emitter or the light irradiation target object to enter the rear surface through the polarizer, the first polarization reflector, the second polarization reflector, the half-wave plate, the first polarization reflector, and the second polarization reflector.

This application claims the benefit of Japanese Priority Patent Application No. JP 2014-72476 filed with the Japan patent office on Jan. 31, 2014, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:
1. A floating image display unit, comprising:
a substrate;
an optical plate on the substrate, wherein
the optical plate includes a plurality of optical elements in a matrix,
the substrate has a normal in a Z-axis direction, and
each optical element of the plurality of optical elements is configured to reflect a first light beam of a Z-axis direction component and recursively reflect a second light beam of an XY-direction component in an XY plane;
a plurality of reflectors, wherein at least one reflector of the plurality of reflectors is configured to:
reflect light outputted from one of a light emitter or a light irradiation target object; and
control the light to obliquely enter a rear surface of the optical plate based on the reflection of the light outputted from the one of the light emitter or the light irradiation target object, wherein
a first reflector of the plurality of reflectors is one of parallel to or oblique to the normal in the Z-axis direction of the substrate,
a second reflector of the plurality of reflectors is one of parallel to or oblique to the rear surface of the optical plate,
the first reflector is in direct contact with the second reflector, and
a first surface on a viewer side of the optical plate is a front surface of the optical plate and a second surface opposite to the front surface of the optical plate is the rear surface of the optical plate; and
a supporting plate configured to support the one of the light emitter or the light irradiation target object, wherein
the supporting plate is in direct contact with each of the second reflector and the rear surface of the optical plate, and
the supporting plate is parallel to the first reflector.

2. The floating image display unit according to claim 1, wherein
the first reflector of the plurality of reflectors is between a symmetric position and the plurality of optical elements,
the symmetric position is a plane-symmetric position to a real image with respect to a plane that includes the optical plate,
the real image is on a front surface side of the optical plate based on the reflection of the light outputted from the one of the light emitter or the light irradiation target object by the at least one reflector of the plurality of reflectors, and the at least one reflector of the plurality of reflectors is further configured to control the light to pass through the optical plate from a rear surface side of the optical plate.

3. The floating image display unit according to claim 2, wherein
the at least one reflector of the plurality of reflectors is on the rear surface side of the optical plate, and
the at least one reflector of the plurality of reflectors is closer to the rear surface of the optical plate than the symmetric position.

4. The floating image display unit according to claim 3, wherein
the one of the light emitter or the light irradiation target object is at a position where the light outputted from the one of the light emitter or the light irradiation target object is reflected by the first reflector.

5. The floating image display unit according to claim 4, wherein
the one of the light emitter or the light irradiation target object is in a same layer as a clearance between the rear surface of the optical plate and the second reflector.

6. The floating image display unit according to claim 3, wherein
the first reflector is in a same layer as a clearance between the rear surface of the optical plate and the second reflector, and
the one of the light emitter or the light irradiation target object is at a position where the light outputted from the one of the light emitter or the light irradiation target object is reflected by the first reflector and the second reflector.

7. The floating image display unit according to claim 6, wherein
the one of the light emitter or the light irradiation target object is in the same layer as the clearance between the rear surface of the optical plate and the second reflector.

8. The floating image display unit according to claim 3, further comprising a light-shielding plate between the one of the light emitter or the light irradiation target object and the plurality of optical elements.

9. The floating image display unit according to claim 3, wherein
the one of the light emitter or the light irradiation target object is on the rear surface side of the optical plate.

10. The floating image display unit according to claim 9, wherein
the light emitter is a display panel configured to display an image based on an image signal, and
the image signal is input from outside of the light emitter.

11. The floating image display unit according to claim 9, wherein
the light irradiation target object is a translucent screen having light transparency.

12. The floating image display unit according to claim 8, further comprising:
a polarizer, wherein the polarizer is one of in contact with or in proximity to the one of the light emitter or the light irradiation target object, and wherein the polarizer is configured to:
allow first polarized light of one of p-polarized light or s-polarized light to pass therethrough; and
one of absorb or reflect a second polarized light of the one of the p-polarized light or the s-polarized light;
a first polarization reflector configured to allow the first polarized light to pass therethrough and reflect the second polarized light;
a second polarization reflector configured to allow the second polarized light to pass therethrough and reflect the first polarized light, wherein
the first polarization reflector is one of in contact with or in proximity to the one of the light emitter or the light irradiation target object, and
the second polarization reflector is in contact with or in proximity to the rear surface; and
a half-wave plate between the one of the light emitter or the light irradiation target object and the rear surface of the optical plate.

13. The floating image display unit according to claim 12, wherein
the polarizer, the first polarization reflector, the second polarization reflector, and the half-wave plate are configured to allow the light outputted from the one of the light emitter or the light irradiation target object to enter the rear surface of the optical plate through the polarizer, the first polarization reflector, the second polarization reflector, the half-wave plate, the first polarization reflector, and the second polarization reflector.

* * * * *